US008265336B2

(12) United States Patent
Manabe

(10) Patent No.: US 8,265,336 B2
(45) Date of Patent: Sep. 11, 2012

(54) PAPER IDENTIFYING APPARATUS AND PAPER IDENTIFYING METHOD

(75) Inventor: Kunihiro Manabe, Tokyo (JP)

(73) Assignee: Universal Entertainment Corporation, Tokyo (JP)

( * ) Notice: Subject to any disclaimer, the term of this patent is extended or adjusted under 35 U.S.C. 154(b) by 182 days.

(21) Appl. No.: 12/922,535

(22) PCT Filed: Feb. 27, 2009

(86) PCT No.: PCT/JP2009/053659
§ 371 (c)(1),
(2), (4) Date: Sep. 14, 2010

(87) PCT Pub. No.: WO2009/113406
PCT Pub. Date: Sep. 17, 2009

(65) Prior Publication Data
US 2011/0019872 A1    Jan. 27, 2011

(30) Foreign Application Priority Data
Mar. 14, 2008    (JP) .................................. 2008-065459

(51) Int. Cl.
G06K 9/00    (2006.01)
(52) U.S. Cl. ........................................ 382/100; 382/181
(58) Field of Classification Search ........... 382/100–325
See application file for complete search history.

(56) References Cited

U.S. PATENT DOCUMENTS

| | | | | |
|---|---|---|---|---|
| 5,399,874 A * | 3/1995 | Gonsalves et al. | ............ | 250/556 |
| 5,850,297 A * | 12/1998 | Honda | .......................... | 358/474 |
| 5,930,001 A * | 7/1999 | Satoh et al. | .................... | 358/296 |
| 6,487,301 B1 * | 11/2002 | Zhao | ............................. | 382/100 |
| 6,714,288 B2 * | 3/2004 | Cohen | ............................. | 356/71 |
| 6,766,045 B2 * | 7/2004 | Slepyan et al. | ................ | 382/135 |
| 6,797,974 B2 * | 9/2004 | Philipp et al. | ................. | 250/556 |
| 6,807,285 B1 * | 10/2004 | Iwamura | ....................... | 382/100 |
| 6,924,826 B1 * | 8/2005 | Nakagiri et al. | .............. | 715/700 |
| 6,970,573 B2 * | 11/2005 | Carr et al. | ...................... | 382/100 |
| 7,046,820 B2 * | 5/2006 | Yu | .................................. | 382/100 |
| 7,103,438 B2 * | 9/2006 | Hallowell et al. | ............. | 700/116 |
| 7,245,740 B2 * | 7/2007 | Suzaki | ........................... | 382/100 |
| 7,286,682 B1 * | 10/2007 | Sharma et al. | ................ | 382/100 |
| 7,586,592 B2 * | 9/2009 | Itako et al. | ...................... | 356/71 |
| 7,757,090 B2 * | 7/2010 | Silverbrook et al. | .......... | 713/176 |

(Continued)

FOREIGN PATENT DOCUMENTS

JP    2003 77025    3/2003

(Continued)

*Primary Examiner* — Manav Seth
(74) *Attorney, Agent, or Firm* — KMF Patent Services, PLLC; Kenneth M. Fagin, Esq.

(57) ABSTRACT

A bill identification apparatus which accurately identifies an authenticity of a watermarked area formed on a bill is provided. The bill identification apparatus has light receiving parts (81c, 82c) which respectively receive reflected lights from a front surface and a rear surface of a watermarked image formed on the bill conveyed, a converter (232) which converts a watermark image from the reflected lights respectively received by the light receiving parts (81c, 82c) to data including color information having brightness for each pixel as a unit of a predetermined size, and an identification processing part (235) which identifies the authenticity of the watermark image based on the density value for each pixel of the light receiving parts (81c, 82c) converted by the converter (232) and a density value for each pixel of a watermarked image by a transmitted light of the bill as the reference.

18 Claims, 13 Drawing Sheets

U.S. PATENT DOCUMENTS

| | | | |
|---|---|---|---|
| 2003/0076979 A1* | 4/2003 | Matsui | 382/100 |
| 2003/0169899 A1* | 9/2003 | Slepyan et al. | 382/100 |
| 2004/0013284 A1* | 1/2004 | Yu | 382/100 |
| 2005/0033965 A1* | 2/2005 | Iwamura | 713/176 |
| 2008/0067230 A1* | 3/2008 | Silverbrook et al. | 235/375 |
| 2008/0137072 A1* | 6/2008 | Itako et al. | 356/73 |
| 2010/0294833 A1* | 11/2010 | Silverbrook et al. | 235/375 |
| 2010/0295291 A1* | 11/2010 | Rancien et al. | 283/113 |
| 2011/0124405 A1* | 5/2011 | Okada et al. | 463/25 |

FOREIGN PATENT DOCUMENTS

| | | |
|---|---|---|
| JP | 2006 285775 | 10/2006 |
| JP | 2008 21180 | 1/2008 |

* cited by examiner

Density values of standard image s [i, j] (transmitted image)

| j\i | 1 | 2 | 3 | 4 | 5 | 6 | 7 |
|---|---|---|---|---|---|---|---|
| 1 | 168 | 209 | 40 | 250 | 67 | 123 | 193 |
| 2 | 147 | 205 | 2 | 207 | 149 | 253 | 114 |
| 3 | 152 | 222 | 70 | 238 | 194 | 236 | 49 |
| 4 | 115 | 229 | 230 | 230 | 135 | 227 | 100 |
| 5 | 237 | 248 | 37 | 210 | 133 | 254 | 210 |
| 6 | 52 | 250 | 44 | 227 | 161 | 241 | 112 |
| 7 | 88 | 237 | 115 | 251 | 27 | 238 | 208 |
| 8 | 41 | 237 | 101 | 220 | 205 | 237 | 116 |
| 9 | 40 | 231 | 102 | 251 | 129 | 211 | 167 |
| 10 | 151 | 215 | 177 | 220 | 185 | 230 | 28 |
| 11 | 62 | 230 | 212 | 223 | 53 | 238 | 205 |
| 12 | 82 | 54 | 127 | 210 | 146 | 74 | 104 |

| Average density value in whole watermarked image | S | 162 |
|---|---|---|

Density value: 0 (black) ~ 255 (white)

Fig. 9A

Density values of reflected image of conveyed bill f [i, j] ( front surface)

| j \ i | 1 | 2 | 3 | 4 | 5 | 6 | 7 |
|---|---|---|---|---|---|---|---|
| 1 | 22 | 229 | 51 | 219 | 122 | 231 | 178 |
| 2 | 240 | 21 | 123 | 39 | 137 | 20 | 64 |
| 3 | 241 | 36 | 134 | 23 | 5 | 30 | 228 |
| 4 | 125 | 8 | 51 | 13 | 124 | 32 | 84 |
| 5 | 186 | 32 | 99 | 9 | 81 | 13 | 176 |
| 6 | 185 | 30 | 158 | 8 | 210 | 43 | 52 |
| 7 | 60 | 36 | 105 | 3 | 51 | 9 | 190 |
| 8 | 229 | 11 | 139 | 50 | 154 | 23 | 34 |
| 9 | 155 | 2 | 150 | 9 | 51 | 36 | 120 |
| 10 | 200 | 12 | 18 | 47 | 166 | 43 | 22 |
| 11 | 163 | 1 | 137 | 1 | 19 | 40 | 0 |
| 12 | 18 | 191 | 172 | 71 | 22 | 159 | 144 |

| Average density value of image of conveyed bill | F | 88 |
|---|---|---|

Density value: 0 (black) ~ 255 (white)

Fig. 9B

Density values of reflected image of conveyed bill f [i, j] (rear surface)

| j \ i | 1 | 2 | 3 | 4 | 5 | 6 | 7 |
|---|---|---|---|---|---|---|---|
| 1 | 79 | 163 | 203 | 92 | 97 | 15 | 89 |
| 2 | 3 | 18 | 61 | 15 | 135 | 5 | 43 |
| 3 | 75 | 42 | 135 | 6 | 237 | 31 | 231 |
| 4 | 68 | 21 | 113 | 14 | 5 | 2 | 129 |
| 5 | 26 | 37 | 245 | 4 | 228 | 20 | 101 |
| 6 | 234 | 43 | 12 | 18 | 4 | 40 | 7 |
| 7 | 33 | 46 | 137 | 2 | 222 | 45 | 48 |
| 8 | 90 | 50 | 80 | 34 | 116 | 16 | 24 |
| 9 | 224 | 4 | 85 | 17 | 19 | 9 | 219 |
| 10 | 133 | 33 | 29 | 29 | 10 | 36 | 248 |
| 11 | 73 | 9 | 80 | 29 | 102 | 32 | 20 |
| 12 | 230 | 146 | 135 | 45 | 23 | 189 | 178 |

| Average density value of image of conveyed bill | F | 79 |
|---|---|---|

Density value: 0 (black) ~ 255 (white)

Fig. 10A

Density values of reflected image of conveyed bill  f [i, j] (front surface)

| j \ i | 1 | 2 | 3 | 4 | 5 | 6 | 7 |
|---|---|---|---|---|---|---|---|
| 1 | 189 | 213 | 66 | 215 | 213 | 78 | 82 |
| 2 | 75 | 8 | 172 | 26 | 184 | 8 | 105 |
| 3 | 152 | 13 | 238 | 7 | 104 | 19 | 190 |
| 4 | 173 | 30 | 82 | 35 | 85 | 18 | 59 |
| 5 | 175 | 34 | 127 | 31 | 154 | 21 | 3 |
| 6 | 122 | 13 | 46 | 37 | 172 | 21 | 168 |
| 7 | 209 | 23 | 210 | 48 | 147 | 7 | 186 |
| 8 | 123 | 14 | 68 | 39 | 198 | 26 | 121 |
| 9 | 33 | 18 | 220 | 7 | 224 | 46 | 1 |
| 10 | 130 | 25 | 119 | 8 | 178 | 39 | 198 |
| 11 | 8 | 14 | 183 | 6 | 176 | 40 | 83 |
| 12 | 91 | 173 | 8 | 148 | 145 | 223 | 126 |

| Average density value of image of conveyed bill | F | 96 |
|---|---|---|

Density value: 0 (black) ~ 255 (white)

Fig. 10B

Density values of reflected image of conveyed bill  f [i, j] (rear surface)

| j \ i | 1 | 2 | 3 | 4 | 5 | 6 | 7 |
|---|---|---|---|---|---|---|---|
| 1 | 178 | 214 | 33 | 255 | 75 | 122 | 197 |
| 2 | 142 | 206 | 9 | 213 | 143 | 253 | 105 |
| 3 | 161 | 216 | 71 | 231 | 202 | 228 | 57 |
| 4 | 108 | 234 | 239 | 225 | 140 | 217 | 104 |
| 5 | 235 | 246 | 30 | 214 | 128 | 255 | 202 |
| 6 | 57 | 246 | 43 | 233 | 154 | 242 | 118 |
| 7 | 95 | 231 | 116 | 251 | 17 | 230 | 204 |
| 8 | 43 | 230 | 109 | 214 | 209 | 242 | 107 |
| 9 | 47 | 228 | 96 | 241 | 120 | 218 | 167 |
| 10 | 143 | 219 | 173 | 225 | 189 | 229 | 22 |
| 11 | 72 | 231 | 207 | 224 | 57 | 241 | 208 |
| 12 | 81 | 61 | 133 | 216 | 148 | 70 | 101 |

| Average density value of image of conveyed bill | F | 162 |
|---|---|---|

Density value: 0 (black) ~ 255 (white)

Fig. 11A

Density values of reflected image of conveyed bill f [i, j] (front surface)

| j \ i | 1 | 2 | 3 | 4 | 5 | 6 | 7 |
|---|---|---|---|---|---|---|---|
| 1 | 178 | 214 | 33 | 255 | 75 | 122 | 197 |
| 2 | 142 | 206 | 9 | 213 | 143 | 253 | 105 |
| 3 | 161 | 216 | 71 | 231 | 202 | 228 | 57 |
| 4 | 108 | 234 | 239 | 225 | 140 | 217 | 104 |
| 5 | 235 | 246 | 30 | 214 | 128 | 255 | 202 |
| 6 | 57 | 246 | 43 | 233 | 154 | 242 | 118 |
| 7 | 60 | 36 | 105 | 3 | 51 | 9 | 190 |
| 8 | 229 | 11 | 139 | 50 | 154 | 23 | 34 |
| 9 | 155 | 2 | 150 | 9 | 51 | 36 | 120 |
| 10 | 200 | 12 | 18 | 47 | 166 | 43 | 22 |
| 11 | 163 | 1 | 137 | 1 | 19 | 40 | 0 |
| 12 | 18 | 191 | 172 | 71 | 22 | 159 | 144 |

A = rows 2–6

| Average density value of image of conveyed bill | F | 122 |
|---|---|---|

Density value: 0 (black) ~ 255 (white)

Fig. 11B

Density values of reflected image of conveyed bill f [i, j] (rear surface)

| j \ i | 1 | 2 | 3 | 4 | 5 | 6 | 7 |
|---|---|---|---|---|---|---|---|
| 1 | 79 | 163 | 203 | 92 | 97 | 15 | 89 |
| 2 | 3 | 18 | 61 | 15 | 135 | 5 | 43 |
| 3 | 75 | 42 | 135 | 6 | 237 | 31 | 231 |
| 4 | 68 | 21 | 113 | 14 | 5 | 2 | 129 |
| 5 | 26 | 37 | 245 | 4 | 228 | 20 | 101 |
| 6 | 234 | 43 | 12 | 18 | 4 | 40 | 7 |
| 7 | 95 | 231 | 116 | 251 | 17 | 230 | 204 |
| 8 | 43 | 230 | 109 | 214 | 209 | 242 | 107 |
| 9 | 47 | 228 | 96 | 241 | 120 | 218 | 167 |
| 10 | 143 | 219 | 173 | 225 | 189 | 229 | 22 |
| 11 | 72 | 231 | 207 | 224 | 57 | 241 | 208 |
| 12 | 81 | 61 | 133 | 216 | 148 | 70 | 101 |

B = rows 7–12

| Average density value of image of conveyed bill | F | 117 |
|---|---|---|

Density value: 0 (black) ~ 255 (white)

Fig. 14

Example of measured image

| j\i | 1 | 2 | 3 | 4 | 5 | 6 | 7 | 8 | 9 | 10 |
|---|---|---|---|---|---|---|---|---|---|---|
| 1 | 151 | 194 | 70 | 228 | 87 | 132 | 222 | 151 | 194 | 70 |
| 2 | 167 | 188 | 26 | 198 | 173 | 274 | 128 | 167 | 188 | 26 |
| 3 | 170 | 226 | 60 | 214 | 220 | 214 | 37 | 170 | 226 | 60 |
| 4 | 110 | 233 | 236 | 203 | 133 | 210 | 79 | 110 | 233 | 236 |
| 5 | 249 | 255 | 17 | 209 | 137 | 255 | 239 | 249 | 255 | 17 |
| 6 | 51 | 255 | 17 | 240 | 163 | 250 | 90 | 51 | 276 | 17 |
| 7 | 113 | 214 | 104 | 242 | 34 | 255 | 224 | 113 | 214 | 104 |
| 8 | 12 | 228 | 90 | 239 | 194 | 226 | 142 | 12 | 228 | 90 |
| 9 | 29 | 219 | 101 | 234 | 127 | 218 | 172 | 29 | 219 | 101 |
| 10 | 130 | 207 | 152 | 194 | 213 | 215 | 56 | 130 | 207 | 152 |
| 11 | 47 | 228 | 191 | 211 | 47 | 255 | 213 | 47 | 228 | 191 |
| 12 | 56 | 60 | 142 | 230 | 160 | 81 | 115 | 56 | 60 | 142 |
| 13 | 151 | 194 | 70 | 228 | 87 | 132 | 222 | 151 | 194 | 70 |
| 14 | 167 | 188 | 26 | 198 | 173 | 255 | 128 | 167 | 188 | 26 |
| 15 | 170 | 226 | 60 | 214 | 220 | 214 | 37 | 170 | 226 | 60 |
| 16 | 110 | 233 | 236 | 203 | 133 | 210 | 79 | 110 | 233 | 236 |
| 17 | 249 | 255 | 17 | 209 | 137 | 255 | 239 | 249 | 255 | 17 |
| 18 | 51 | 255 | 17 | 240 | 163 | 250 | 90 | 51 | 255 | 17 |
| 19 | 113 | 214 | 104 | 242 | 34 | 255 | 224 | 113 | 214 | 104 |

Fig. 15

Correlation coefficients by shift movement in (i, j) direction
(+ right or down,    − left or up)

| j\i | -2 | -1 | 0 | 1 | 2 |
|---|---|---|---|---|---|
| -2 | 0.560 | -0.550 | 0.620 | -0.604 | 0.065 |
| -1 | 0.575 | -0.707 | 0.556 | -0.519 | 0.267 |
| 0 | 0.608 | -0.675 | 0.981 | -0.609 | -0.053 |
| 1 | 0.761 | -0.628 | 0.633 | -0.511 | 0.083 |
| 2 | 0.724 | -0.590 | 0.665 | -0.557 | -0.046 |

PAPER IDENTIFYING APPARATUS AND PAPER IDENTIFYING METHOD

FIELD OF THE INVENTION

The present invention relates to a paper sheet identification apparatus (or paper identifying device) which identifies the authenticity of a bill, a gift certificate, a coupon ticket, and so on (hereafter, these are collectively referred to as a paper sheet), and a paper sheet identification method (or paper identifying method) therefor.

BACKGROUND ART

In general, a bill identification apparatus, which is one of the embodiments of the paper sheet identification apparatus, is incorporated into a service device such as a game medium rental machine installed in a game hall, a vending machine or a ticket-vending machine installed in a public space, or the like which identifies the validity of a bill inserted from a bill insertion slot by a user and provides various types of products and services in accordance with a value of the bill having been judged as legitimate.

Usually, the authenticity of the bill is identified by a bill identification apparatus installed in a bill traveling route continuously extending from a bill insertion slot. The bill moving inside the bill traveling route is irradiated with light, and a transmitted light and a reflected light therefrom are received by a light receiving sensor, and the received light data is compared with the legitimate data to identify the authenticity of the bill.

Meanwhile, various innovations have been devised for bills in order to prevent counterfeiting thereof. As one of those, a watermark with an uneven portrait is formed by a special technique, or a see-through patterned mark which can be determined as authentic or counterfeit with a tactile sense is formed (hereinafter, watermarks formed on bills or see-through patterning are collectively referred to as "a watermark"). Such a watermark may be utilized as an authenticity identification object area in order to improve the identification accuracy of the authenticity of the bill. In Patent reference 1, for example, a bill discrimination device is disclosed, which discriminates the authenticity of the bill by irradiating an infrared light and a visible light to a watermark and acquiring a transmitted light and a reflected light therefrom.

[Patent Reference 1] Japanese unexamined patent application publication No. 2006-285775

DISCLOSURE OF THE INVENTION

Problem to be Solved by the Invention

Since the above-mentioned watermark of the bill is formed by the specialized technique such that the bills cannot be counterfeited, it is considered extremely effective in determining the authenticity. Assuming that an attempt is made to counterfeit such a watermark, a light printed image which is similar to the watermarked image is possibly created onto either surface of a paper to be counterfeited.

Meanwhile, it is difficult to identify the authenticity of the watermark, if a counterfeit watermark is formed by faintly printing the image on either surface, by a change in the light quantity of the transmitted light therethrough. In particular, in a configuration in which a light-receiving sensor is installed only on one side of one surface of the bill to be conveyed, if the bill is conveyed as the printing surface of the watermark of the bill is reversed to face the other side, the authenticity identification may not be accurately performed.

A paper sheet identification apparatus and a paper sheet identification method are provided in which the authenticity of a watermark area formed on the paper sheet can be identified accurately.

Means to Solve the Problem

In the present invention, a paper sheet identification apparatus includes: a first light receiving part as first light receiving means and a second receiving part as second receiving means for receiving a reflected light on a front surface and a rear surface with respect to a watermarked image formed on a paper sheet to be conveyed; a converter which converts the reflected light from the watermarked image, being received by the first and second light receiving parts, into data for each pixel of a predetermined size as a unit, which contains color information having brightness; and an identification processing part which identifies the authenticity of the watermarked image based on a density value, converted by the converter, for each pixel of images received by the first and the second light receiving parts and a density value for each pixel of the watermarked image by a transmitted light of the paper sheet as the standard. Here, the first and second light receiving parts may be named relatively. Further features of the present invention, its nature, and various advantages will be more apparent from the accompanying drawings and the following description of the preferred embodiment.

BRIEF DESCRIPTION OF THE DRAWINGS

FIG. 9A is a diagram showing image data acquired by a light reflected on a front surface in a watermark forming area of the bill being conveyed in the case of the bill being legitimate.

FIG. 9B is a diagram showing image data acquired by a light reflected on a rear surface in a watermark forming area of the bill being conveyed in the case of the bill being legitimate.

FIG. 10A is a diagram showing image data acquired by a light reflected on a front surface in a watermark forming area of the bill being conveyed in the case of the bill being counterfeit.

FIG. 10B is a diagram showing image data acquired by a light reflected on a rear surface in a watermark forming area of the bill being conveyed in the case of the bill being counterfeit.

FIG. 11A is a diagram showing image data acquired by a light reflected on a front surface in a watermark forming area of the bill being conveyed in the case of the bill being counterfeit and having printed images on both surfaces.

FIG. 11B is a diagram showing image data acquired by a light reflected on a rear surface in a watermark forming area of the bill being conveyed in the case of the bill being counterfeit and having printed images on both surfaces.

FIG. 14 shows a diagram illustrating measurement sample data corresponding to the standard data of FIG. 8.

FIG. 15 shows a diagram illustrating distribution of correlation coefficients in case an image is shifted in an (i, j) direction.

DESCRIPTION OF NOTATIONS

| | |
|---|---|
| 1 | bill identification apparatus |
| 2 | apparatus main body |
| 3 | bill traveling route |
| 5 | bill insertion slot |
| 6 | bill conveyance mechanism |
| 8 | bill reading means |
| 10 | skew correction mechanism |
| 81, 82 | light receiving/emitting unit |
| 81a, 81b, 82a, 82b | light emitting part |
| 81c, 82c | light receiving part |
| 200 | control means |

BEST MODE FOR CARRYING OUT THE INVENTION

Hereinafter, an embodiment of the present invention will be described with reference to the drawings.

Figure 1:
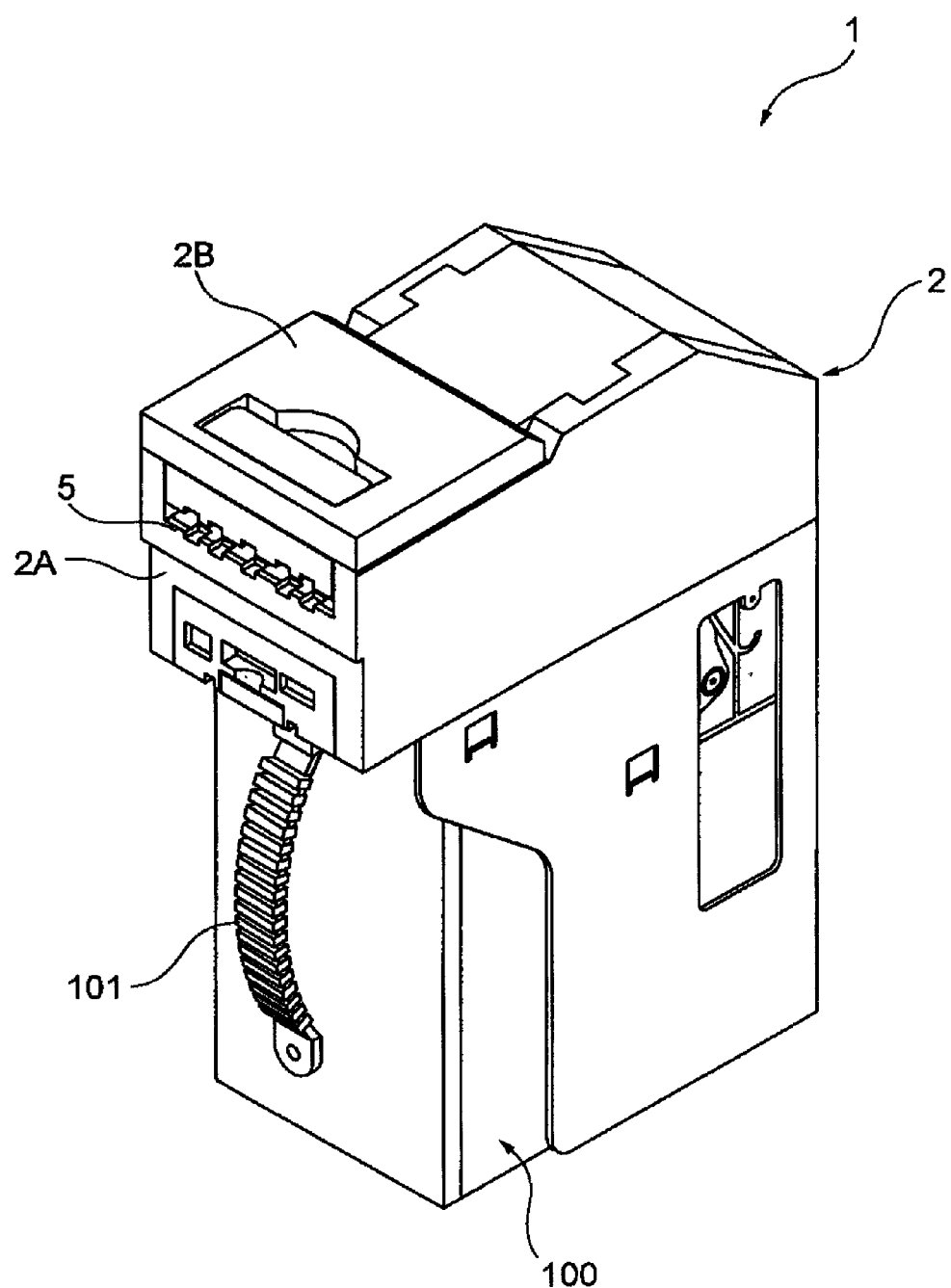
FIG. 1 is a perspective view showing an entire structure of an example of a bill identification apparatus embodied from a paper sheet identification apparatus.
Figure 2:
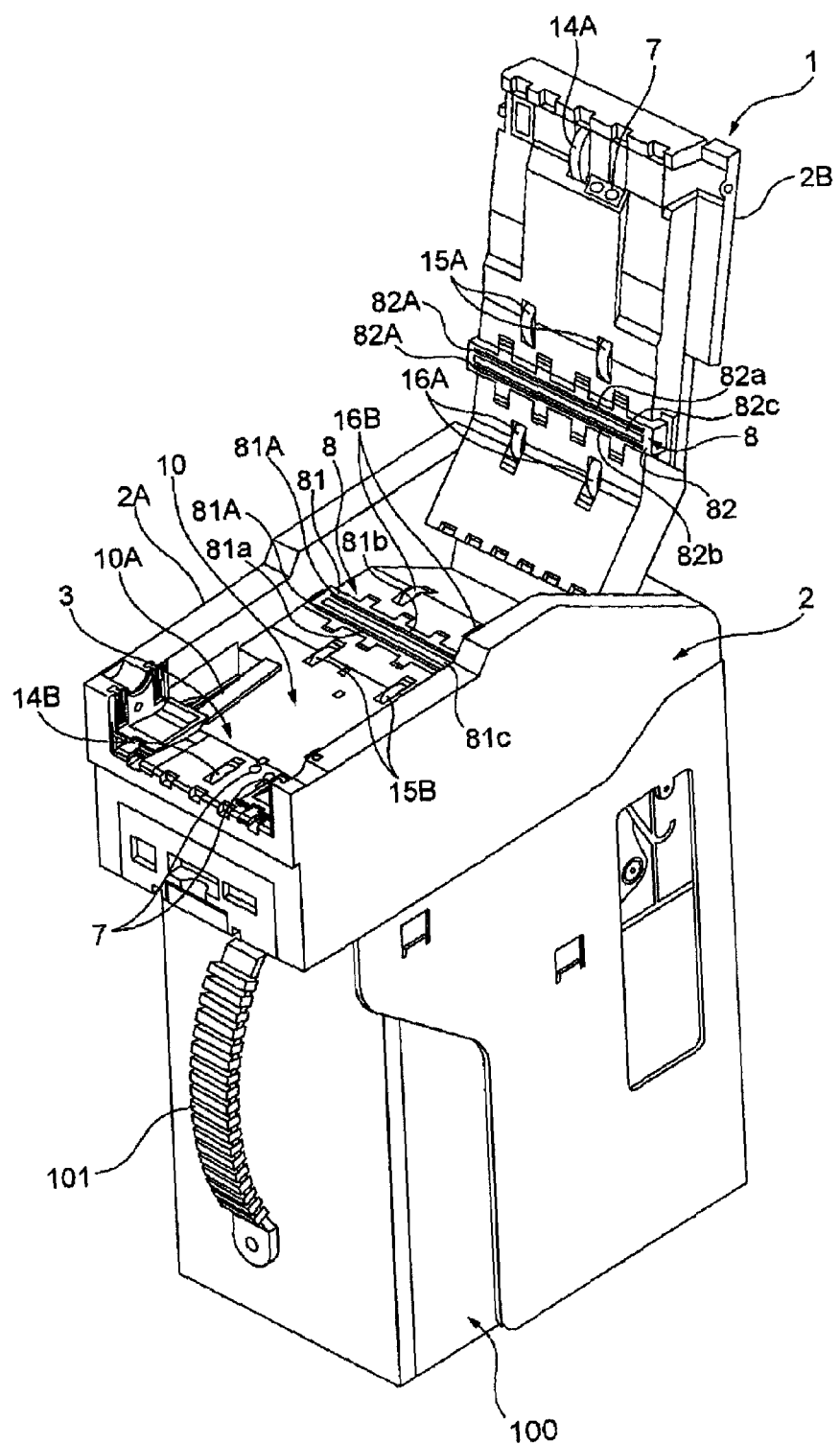
FIG. 2 is a perspective view showing the bill identification apparatus in a state that an open/close member is opened for a main body frame of an apparatus main body.
Figure 3:
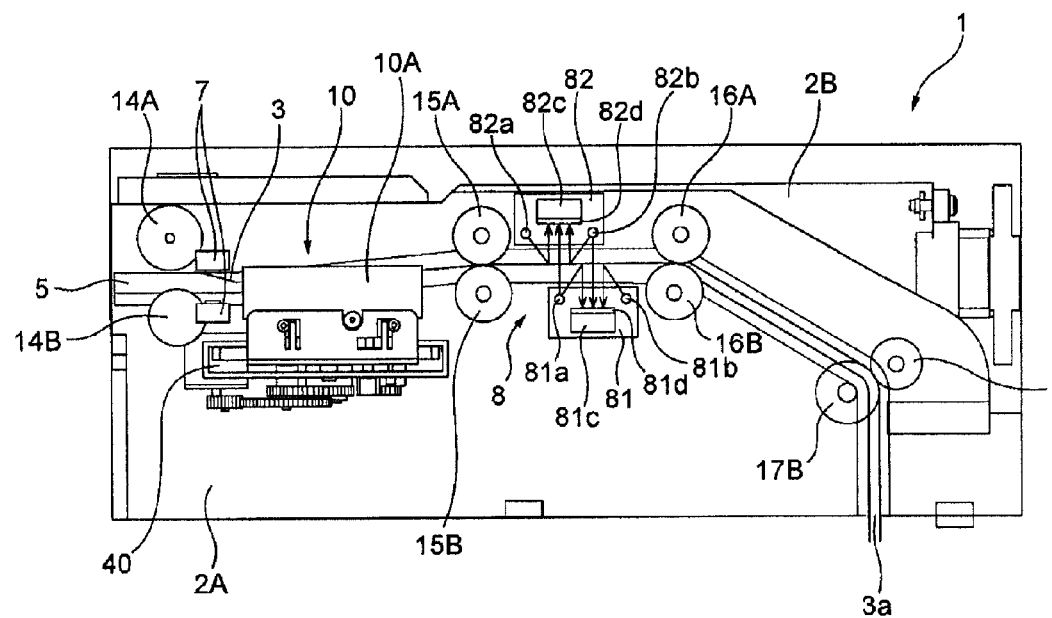
FIG. 3 is a right side view schematically showing a traveling route of a bill to be inserted from an insertion slot.

FIGS. 1 to 3 are diagrams showing an example where a paper sheet identification apparatus of the present invention is applied to a bill identification apparatus. FIG. 1 is a perspective view showing the entire structure; FIG. 2 is a perspective view showing a state that an open/close member is opened for a main body frame of an apparatus main body; and FIG. 3 is a right side view showing schematically a traveling route of a bill being inserted from an insertion slot.

A bill identification apparatus 1 of this embodiment is so configured that it can be incorporated into, for example, various types of gaming machines such as a slot machine and the like, and the bill identification apparatus 1 includes an apparatus main body 2 and a housing part (e.g., stacker or cashbox) 100 which is provided to the apparatus main body 2 and is capable of stacking and housing a great number of bills. Here, the housing part 100 may be mountable to and demountable from the apparatus main body 2, and it is possible, for example, to remove it from the apparatus main body 2 by pulling a handle 101 provided on the front face thereof in a state that a lock mechanism (not shown) is unlocked.

As shown in FIG. 2, the apparatus main body 2 has a main frame body 2A and an open/close member 2B being configured to be opened and closed for the main body frame 2A by rotating around an axis positioned at one end thereof as a rotating center. Then, as shown in FIG. 3, the frame 2A and the open/close member 2B are configured to form a space (bill traveling route 3) through which a bill is conveyed such that both face each other across the space when the open/close member 2B is closed for the main body frame 2A, and to form a bill insertion slot such that front exposed faces of both are aligned and that the bill traveling route 3 exits at the bill insertion slot 5. In addition, the bill insertion slot 5 is a slit-like opening from which a short side of a bill can be inserted into the inside of the apparatus main body 2.

Also, in the apparatus main body 2, a bill conveyance mechanism 6 that conveys a bill along a bill traveling route 3; an insertion detecting sensor 7 that detects the bill inserted into the bill insertion slot 5; bill reading means 8 of a bill reading device that is installed on a downstream side of the insertion detecting sensor 7 and reads out information on the bill in a traveling sate; and a skew correction mechanism 10 that accurately positions and conveys the bill with respect to the bill reading means 8 are provided.

Hereafter, the respective components described above will be described in detail.

The bill traveling route 3 extends from the bill insertion slot 5 toward the inside, and comprises a discharge slot 3a formed on the downstream side through which a bill is discharged into a bill housing part 100.

The bill conveyance mechanism 6 is a mechanism capable of conveying the bill inserted from the bill insertion slot 5 along the insertion direction, and of conveying back the bill in an insertion state toward the bill insertion slot 5. The bill conveyance mechanism 6 comprises a motor 13 (refer to FIG. 5) serving as a driving source installed in the apparatus main body 2; and conveyor roller pairs (14A and 14B), (15A and 15B), (16A and 16B), and (17A and 17B) which are installed with predetermined intervals along the bill traveling direction in the bill traveling route 3, and are driven to rotate by the motor 13.

The conveyor roller pairs are installed so as to be partially exposed on the bill traveling route 3, and all the pairs are constituted of driving rollers of the conveyor rollers 14B, 15B, 16B, and 17B installed on the underside of the bill traveling route 3 driven by the motor 13; and pinch-rollers of the conveyor rollers 14A, 15A, 16A, and 17A installed on the upperside and driven by the these driving rollers. In addition, the conveyor roller pair (14A and 14B) to first nip and hold therebetween the bill inserted from the bill insertion slot 5, and to convey the bill toward the back side, as shown in FIG. 2, is installed in one portion of the center position of the bill traveling route 3, and a couple of the conveyor roller pairs (15A and 15B), (16A and 16B), or (17A and 17B) being disposed in this order on the downstream side thereof are respectively installed in a couple of portions with a predetermined interval in the lateral direction of the bill traveling route 3.

Further, the conveyor roller pair (14A and 14B) disposed in the vicinity of the bill insertion slot 5 is usually in a state that the upper conveyor roller 14A is spaced from the lower conveyor roller 14B, and the upper conveyor roller 14A is driven to move toward the lower conveyor roller 14B to nip and hold the inserted bill therebetween when insertion of the bill is detected by the insertion detecting sensor 7.

Further, the skew correction mechanism 10 comprises a pair of right and left movable pieces 10A (only one side is shown) such that the pair of right and left movable pieces 10A are moved to get closer with each other by driving a motor 40 for a skew driving mechanism, whereby the skew correction process is performed for the bill.

The insertion detecting sensor 7 is to generate a detection signal when a bill inserted into the bill insertion slot 5 is detected. And when the detection signal is generated, the above-mentioned motor 13 is driven in a normal direction and the bill is conveyed in the insertion direction. The insertion detecting sensor 7 of this embodiment is installed between the pair of conveyor rollers (14A and 14B) and the skew correction mechanism 10 and comprises, for example, an optical sensor such as a regressive reflection type photo sensor. However, the insertion detecting sensor 7 may comprise a mechanical sensor other than the optical sensor.

The bill reading means 8 reads bill information on the bill conveyed in a state that the skew is eliminated by the skew correction mechanism 10, and determines the validity (authenticity). In this embodiment, the bill reading means 8 is configured to comprise a line sensor which irradiates the bill being conveyed from top and bottom sides thereof with light such that a transmitted light and a reflected light thereof are detected by a light receiving element so as to perform reading.

An authenticity identification process in the bill reading means 8 comprises the steps of: in order to improve the identification accuracy, irradiating a printed portion of the bill to be conveyed with light, receiving a transmitted light and a reflected light therefrom, and determining whether or not a feature point in the printed portion (an area of the feature point serving as the identification object and a way of extracting the area are arbitrarily determined) is matched to that of the legitimate bill.

Then, in the present invention, when such an authenticity identification process is executed, a watermarked portion formed on the bill is also designated as an identification object area in an authenticity judgment process, and, as will be described later, an authenticity judgment is performed such that the bill information on the watermarked portion read by the bill reading means 8 is converted into a two-dimensional image. That is, since the watermarked portion is a characteristic portion serving as one of the means in order to prevent the bill from being counterfeited, it is possible to further improve the identification accuracy by acquiring a two-dimensional image of such a watermarked area and comparing the two-dimensional image with data of the watermarked portion of the legitimate bill.

Also, since the legitimate bill has some area from which different image data are acquired depending on the wavelengths of the lights (for example, a visible light or an infrared light) irradiated to the area, in this embodiment, a plurality of light sources, in consideration of this view point, irradiate different lights of different wavelengths (in this embodiment, a red light and an infrared light are irradiated) to the bill and a transmitted light therethrough and a reflected light thereon are detected such that the authenticity identification accuracy may be improved. That is, since the red light and the infrared light have different wavelengths, transmitted-light data and reflected-light data from a plurality of lights of different wavelengths may be utilized for the bill authenticity judgment, whereby the judgment may use the nature that the transmittance of the transmitted light transmitted through the specific area and the reflectance of the reflected light reflected on the specific area in the legitimate bill are different from those of the counterfeit bill. Therefore, an attempt is made to further improve the bill authenticity identification accuracy by employing light sources where a plurality of wavelengths are available.

Here, since it is possible to acquire various kinds of received-light data (transmitted-light data and reflected-light data) depending on the wavelengths of the irradiated lights to the bill and the irradiated areas of the bill, although a concrete bill authenticity identification method will not be written in detail, the image appears greatly different depending on the lights in a watermarked area of the bill, for example, if an image on the area is viewed with the lights of different wavelengths. Therefore, it can be considered that the bill to become an identification object is identified as the legitimate bill or the counterfeit bill by setting this portion as the specified area, acquiring transmitted-light data and reflected-light data from the specified area, and comparing such data with legitimate data from the same specified area of the legitimate bill having been stored in advance in storage means (ROM). At this time, provided that specified areas are predetermined according to the kinds of the bills, and that predetermined weighting may be applied to the transmitted-light data and the reflected-light data from this specified area, the authenticity identification accuracy may be improved.

Then, since the above-mentioned bill reading means 8 is, to be described later, configured to perform the lighting control of the light emitting part with a predetermined interval and to comprise the line sensor which detects the transmitted light and the reflected light as the bill passes through, it is possible to acquire the image data based on the plurality of pieces of pixel information in a predetermined size as a unit by the line sensor. This predetermined size, for example, may be set to a size in which it is possible to sufficiently comprehend a feature of an image to be authorized. More specifically, a size which is half of or less than, and more preferably, one-tenth of or less than a typical size of the feature of the image (for example, in a shape of "+", a height of the shape) can be cited as an example. On the other hand, when a size of an image to be authorized is too small, it is beyond the resolution of the light receiving part (typically, the recognition ability based on a size of an image). For example, when a size of one pixel is greater than or equal to a size of an image to be authorized, the entire image is to be included in one pixel, and therefore, the feature of the portion of the image cannot be comprehended by the pixel of this pixel size. Therefore, the image is preferably of a size to an extent where the image is not beyond the resolution. Further, when the number of pixels is too great, it takes huge amounts of time for image processing which will be described later. Therefore, the image preferably has a predetermined size such that the number of pixels constituting the image is set as the image processing time is taken into account.

In this case, the image data acquired by the line sensor is converted into data containing color information having brightness for each pixel by a converter which will be described later. In addition, the color information of each pixel having brightness to be converted by the converter corresponds to a contrasting density value, i.e., a density value (luminance value), and a numerical value from 0 to 255 (0: black to 255: white) is allocated to each pixel, for example, as information of one byte according to its density value.

Therefore, in above-mentioned authenticity identification process, not limited to the watermarked portion formed on the bill, but a variety of area of the bill may be extracted; the pixel information (density values) contained in the extracted area and the pixel information in the same area of the legitimate bill may be used so as to be substituted into an appropriate correlating equation; and then a coefficient of correlation may be obtained by carrying out an operation thereof, whereby the authenticity identification may be judged by the coefficient. Or, in addition to the above description, analog waveforms, for example, may be generated from the transmitted-light data and the reflected-light data, and the respective shapes of those waveforms may be compared with each other, whereby the authenticity identification may be judged by such comparison.

Here, the configuration of above-mentioned reading means 8 will be described in detail with reference to FIGS. 2 and 3.

The above-described bill reading means 8 has light receiving/emitting units 81, 82 which are installed on the both sides of the bill traveling route 3, and the respective light receiving/emitting units 81, 82 are configured in the same way. The light receiving/emitting unit 81 has light emitting parts 81a, 81b which are disposed along the bill traveling direction and are capable of irradiating a bill to be conveyed with an infrared light and a red light, and a light receiving part 81c installed between these light emitting parts 81a and 81b. Further, the light receiving/emitting unit 82 has light emitting parts 82a, 82b which are disposed along the bill traveling direction and are capable of irradiating a bill to be conveyed with the infrared light and the red light, and a light receiving part 82c being installed between these light emitting parts 82a and 82b.

The above-described light receiving/emitting units 81 and 82 are arranged somewhat in an offset relation with each other along the bill traveling direction, and the respective light emitting parts 81a, 82b work as reflecting and transmitting light sources. That is, an irradiated light from the light emitting part 81a is reflected on a bill being conveyed so as to be detectable by the light receiving part 81c and is transmitted through the bill being conveyed so as to be detectable by the light receiving part 82c. And an irradiated light from the light emitting part 82b is reflected on the bill being conveyed so as to be detectable by the light receiving part 82c and is transmitted through the bill being conveyed so as to be detectable by the light receiving part 81c. Also, the respective light emitting parts 81b, 82a work as light sources for the reflection light. That is, the respective irradiated lights from the light emitting parts 81b and 82a are reflected on the bill being conveyed so as to be detectable by the respective light receiving parts 81c, 82c.

The respective light emitting parts (81a, 81b) and (82a, 82b) are, as shown in FIG. 2, constituted of a rectangular bar-like body made of synthetic resin which emits the light guided through a light guiding body provided inside from an LED element 81A and 82A fixed to one end of the bar-like body. The light emitting part having such a configuration is linearly installed in parallel with the light receiving part 81c, 82c (light receiving sensors) so as to be capable of entirely and equally irradiating the entire range in the width direction of the traveling route of the bill to be conveyed although the configuration is simple.

Also, the light receiving parts 81c, 82c of the light receiving/emitting unit 81, 82 are formed in a thin-walled plate shape having a band shape extending in a lateral direction of the bill traveling route 3 and having a width to an extent that the sensitivity of light receiving sensors (not shown) provided in the light receiving parts is not affected. In addition, the light receiving sensors are configured as a so-called line sensor in which a plurality of CCDs (Charge Coupled Devices) are provided linearly at the center in the thickness direction of the light receiving part 81c, 82c, and GRIN lens arrays 81d, 82d are disposed linearly above these CCDs so as to collect the transmitted light and the reflected light.

Therefore, it is possible for the light receiving part 81c to receive the reflected light of the infrared light or the red light emitted from the light emitting part 81a, 81b to the bill as the object for authenticity judgment and the transmitted light from the light emitting part 82b, and generate contrasting density data (pixel data containing information of brightness) according to its luminance as the received-light data and a two-dimensional image from the contrasting density data. In a similar manner, it is possible for the light receiving part 82c to receive the reflected light of the infrared light or the red light emitted from the light emitting part 82a, 82b to the bill as the object for authenticity judgment and the transmitted light from the light emitting part 81a, and generate contrasting density data (pixel data containing information of brightness) according to its luminance as the received-light data and a two-dimensional image from the contrasting density data.

The respective light emitting parts (81a, 81b) and (82a, 82b) are capable of irradiating the bill with the light at an elevation angle of 45 degrees, for example, and are so installed that the light receiving parts 81c, 82c may receive the reflected light from the bill. In this case, the incident angle with respect to the bill to be conveyed is not limited to 45 degrees such that the arrangement of the respective emitting parts may be re-arranged as appropriate as long as the lights are irradiated evenly without shading to the surface of the bill. In reading the watermarked portion, it is preferable to adjust the elevation angle such that the image drawn on the front surface may mainly be read by the reflected light received by the light receiving parts 81c, 82c. It is more preferable to adjust the angle in consideration of the wavelength of the irradiated light. Further, the light emitting parts of the respective light receiving/emitting units 81, 82 are disposed on both sides of (and arranged across) the light receiving parts 81c, 82c and irradiate the respective lights at respective predetermined angles to the bill from the both sides. This is because, in the case where the surface of the bill has scratches or folded wrinkles and in the case where the light is irradiated only from one side to an uneven surface generated by these scratches or folded wrinkles, there may be some portions which are unavoidably shaded to cause shadows in the uneven surface. Therefore, the shadows made in the uneven surface may be prevented by irradiating the lights from the both sides, whereby the image data to be acquired can have a higher degree of precision than that acquired by the single side irradiation. However, the light emitting parts of the respective light receiving/emitting units, as a matter of course, may have a configuration to be installed only on one side.

In addition, the configuration, the arrangement, and the like of the light receiving/emitting units 81, 82 as described above are not limited to those described in this embodiment, and may be modified as appropriate as long as they can receive the reflected light from both surface sides of the bill being conveyed and the transmitted light therefrom.

Figure 4:
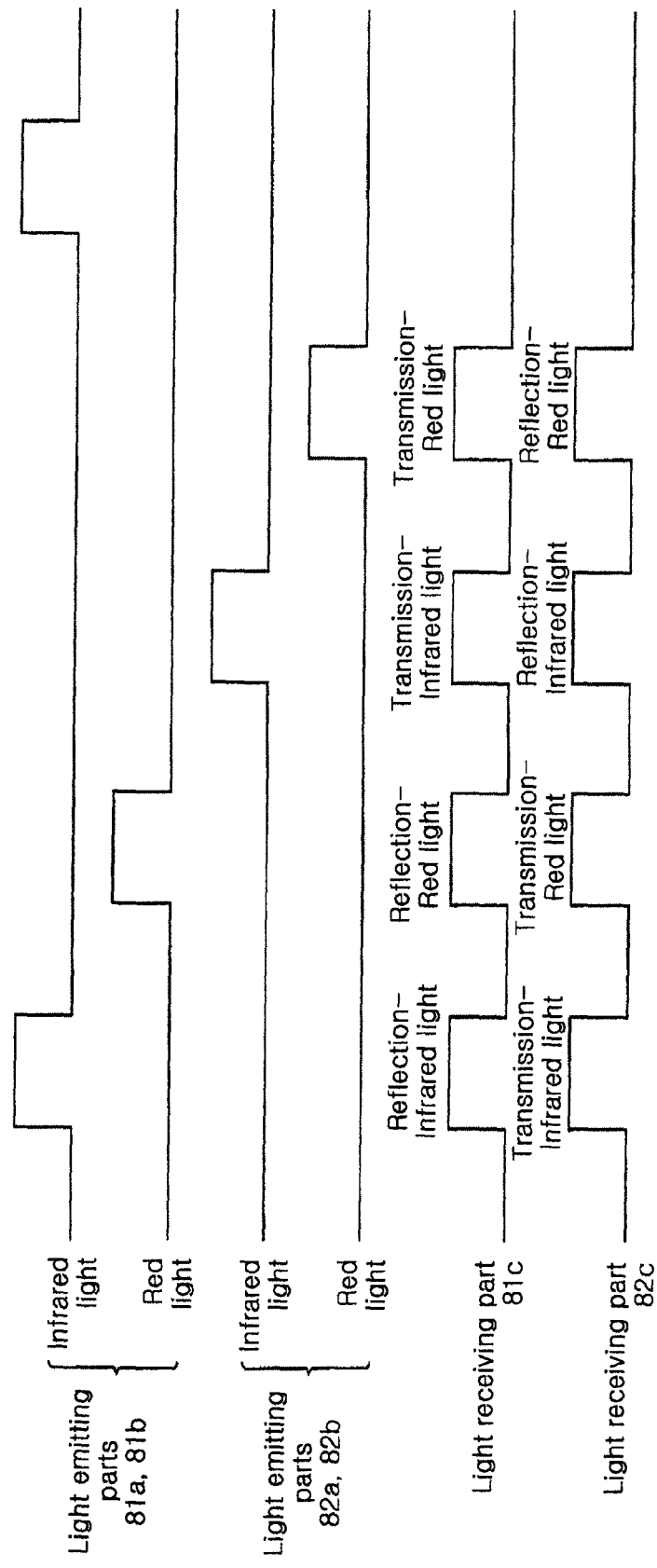
FIG. 4 shows a timing diagram illustrating lighting control of a light emitting part when the bill is read, which indicates the lighting control of the light emitting part in the bill reading means.

Further, in the respective light emitting parts (81a, 81b) and (82a, 82b) of the light receiving/emitting units 81, 82 as described above, when the bill is read, as shown in a timing diagram of FIG. 4, the apparatus is configured such that an infrared light and a red light are controlled to be turned on and off with predetermined intervals. That is, the lighting control is performed such that the four light emitting parts (81a, 81b) and (82a, 82b) which emit a red light and an infrared light are repeatedly turned on and off with a constant interval (predetermined lighting interval), and two or more of the light sources are not simultaneously turned on such that the lighting phases of the respective light sources may not overlap. In other words, lighting control is performed such that, while any one light source is turned on, the other three light sources are turned off.

Thereby, it is possible for each of the light receiving parts 81c, 82c to detect each light from each light source with a constant interval such that an image constituted of contrasting density data of the bill by the reflected light and the transmitted light can be read out. In this case, it is also possible to improve the resolution by controlling the lighting interval to be made shorter.

Then, the bill identified as legitimate by the bill reading means 8, which is configured as described above, is conveyed to the aforementioned bill housing part 100 via a discharge slot 3a of the bill traveling route 3 by the bill conveyance mechanism 6, and the bill is stacked and housed sequentially in the bill housing part. Further, the bill identified as counterfeit is returned toward the bill insertion slot 5 by driving the bill conveyance mechanism 6 to reversely rotate, and the bill is discharged from the bill insertion slot 5.

Next, control means 200 as a control part that controls operations of the above-mentioned bill identification apparatus 1 will be described with reference to a block diagram of FIG. 5.

Figure 5:
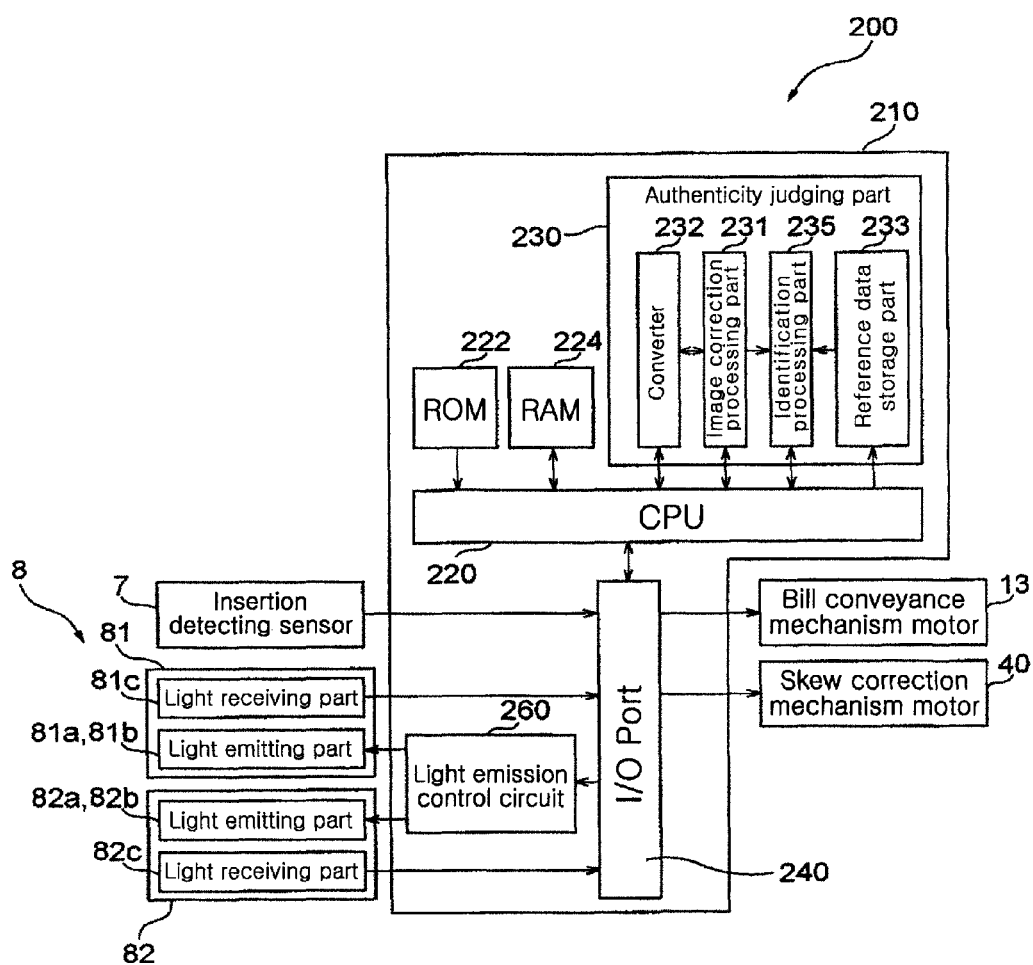
FIG. 5 is a block diagram showing a configuration of control means for controlling an operation of the bill identification apparatus.

The control means 200 as shown in the block diagram of FIG. 5 comprises a control board 210 which controls the operations of the above-described respective drive units. And a CPU (Central Processing Unit) 220 of a processor controlling driving of each drive unit and constituting the bill identification means, a ROM (Read Only Memory) 222, a PAM (Random Access Memory) 224, and an authenticity judging part 230 are implemented on the control board 210.

In the ROM 222, permanent data such as various types of programs such as an authenticity judgment program in the authenticity judging part 230, operation programs for the respective drive units such as the motor 13 for the bill conveyance mechanism and the motor 40 for the skew correction mechanism, and the like are stored.

The CPU 220 operates according to the programs stored in the ROM 222, and carries out input and output of the signals with respect to the respective drive units described above via an I/O port 240, so as to perform the entire operational control of the bill identification apparatus. That is, drive units such as the motor 13 for the bill conveyance mechanism, the motor 40 for the skew correction mechanism, and so on are connected to the CPU 220 via the I/O port 240, and the operations of these drive units are controlled by control signals transmitted from the CPU 220 in accordance with the operation programs stored in the ROM 222. Further, the CPU 220 is so configured that detection signals from the insertion detecting sensor 7 and the movable piece passage detecting sensor 12 are input into the CPU 220 via the I/O port 240, and the driving of the above-mentioned respective drive units is controlled based on these detection signals.

Moreover, the CPU 220 is so configured that a detection signal based on a transmitted light and a reflected light of the light which is irradiated to the bill is input into the CPU 220 via the I/O port 240 from the light receiving parts 81c, 82c in the bill reading means 8 as described above.

The RAM 224 temporarily stores data and programs used for the CPU 220 to operate, and also acquires and temporarily stores the received light data (image data constituted of a plurality of pixels) of the bill.

The authenticity judging part 230 has a function to carry out the authenticity identification process with respect to the bill to be conveyed so as to identify the authenticity of the bill. This authenticity judging part 230 comprises: a converter 232 which converts the received light data of the bill stored in the RAM 224 into pixel information containing color information having brightness (density value) for each pixel; an image correction processing part 231 which conducts a correction process of the color information of each pixel based on the pixel information converted by the converter 232; a reference data storage part 233 which stores reference data of the legitimate bill; and an identification processing part 235 which compares the image data (comparison data) converted by the converter 232 with respect to the bill subject to the authenticity judgment object with the reference data stored in the reference data storage part 233 so as to perform the authenticity identification process.

In this case, the above-mentioned reference data storage part stores standard data (reference data) of a standard image of the watermarked portion with respect to the legitimate bill being used in conducting actually the authenticity identification process. In particular, the standard data corresponds to an image data constituted of many pixels to be obtained when the transmitted light is received as the watermark image area of the legitimate bill is irradiated with the light, and is stored in association with predetermined parameters (xStart, yStart, xsize, ysize).

The above-mentioned standard data by the transmitted light is stored in the dedicated reference data storage part 233. However, the data may be stored in the above-mentioned ROM 222. Further, the standard data may be stored in advance in the reference data storage part 233 or the ROM 222. However, the reference data storage part 233 may be so configured, for example, that the transmitted-light data is acquired as a predetermined number of legitimate bills are conveyed by the bill conveyance mechanism, average values are calculated from the thus-obtained data of the transmitted-light data of a great number of legitimate bills, and these average values are stored as the standard data in the reference data storage part 233.

Moreover, the CPU 220 is configured to be connected to the light emitting parts 81a, 81b of the light receiving/emitting unit 81 and the light emitting parts 82a, 82b of the light receiving/emitting unit 82 in the aforementioned bill reading means 8 via the I/O port 240. The light emitting parts (81a, 81b) and (82a, 82b) are controlled through a light emission control circuit 260 by a control signal from the CPU 220 in accordance with the operation programs stored in the above-mentioned ROM 222 such that the lighting interval and the turning-off are controlled.

According to the bill reading means (line sensor) configured as described above, two-dimensional image information can be obtained from a great amount of pixel information. Then, for example, an object area is extracted based on the parameters on the occasion of conducting the authenticity identification on the basis of the brightness information of the respective pixels converted by the above-mentioned converter 232, and thus-extracted image information is compared with the standard data so as to conduct the authenticity identification. In this case, the area serving the authenticity identification object is preferably a portion where it is difficult to make a counterfeit. In the present invention, a two-dimensional image of the area of the watermarked portion (portion in which something is inserted during a scooping process of paper manufacture) of the bill is extracted, and the two-dimensional image is compared with the standard data whereby the authenticity identification process is performed.

Meanwhile, as described above, in the case where a watermark formed on the bill is legitimate, when the bill is irradiated with the light and a two-dimensional image is acquired from its reflected light, the watermarked image does not show up as it is seen in any case (the watermarked image does not show up as it is seen in any case on the both sides of the surface and the rear surface). However, in the case of the bill on which the watermark is counterfeited by faintly printing an image on either front or rear surface, when the bill is irradiated with the light and the two-dimensional image is acquired from its reflected light, the watermarked image shows up as it is seen. Then, the watermarked image obtained in this way is in a relationship of closely resembling an image by the transmitted light of the watermarked image of the legitimate bill (the aforementioned standard data). Therefore, it is possible to accurately identify the authenticity thereof by utilizing the relationship between the both.

That is, when the watermark is legitimate, a density value of each pixel obtained by the converter 232 from a reflected light of the watermarked image from either surface of the bill being conveyed is irrelevant to a density value of each pixel obtained from a transmitted light at the same position (which is stored as standard data in advance). However, when a watermark is counterfeited by faintly printing the image on either surface of the bill, a density value of each pixel obtained from the reflected light of the either surface is highly related to a density value of each pixel obtained from the transmitted light at the same position. Therefore, when either of the density values of each pixel obtained from the reflected lights from both surfaces is highly related to the density value of each pixel obtained by the transmitted light, it is possible to judge the watermark is a counterfeited watermark.

In this embodiment, a correlation coefficient R is derived from the density value of each pixel obtained by the converter 232 from the reflected light of the watermarked image and the density value of each pixel obtained from the transmitted light at the same position (this density value is stored as standard data in advance in the reference data storage part 233), and when the correlation coefficient R is greater than or equal to a predetermined value (which is set as a threshold value in advance), it is configured to judge that the correlation is high (the relevance is high) such that the bill is identified as counterfeit.

Figure 6:
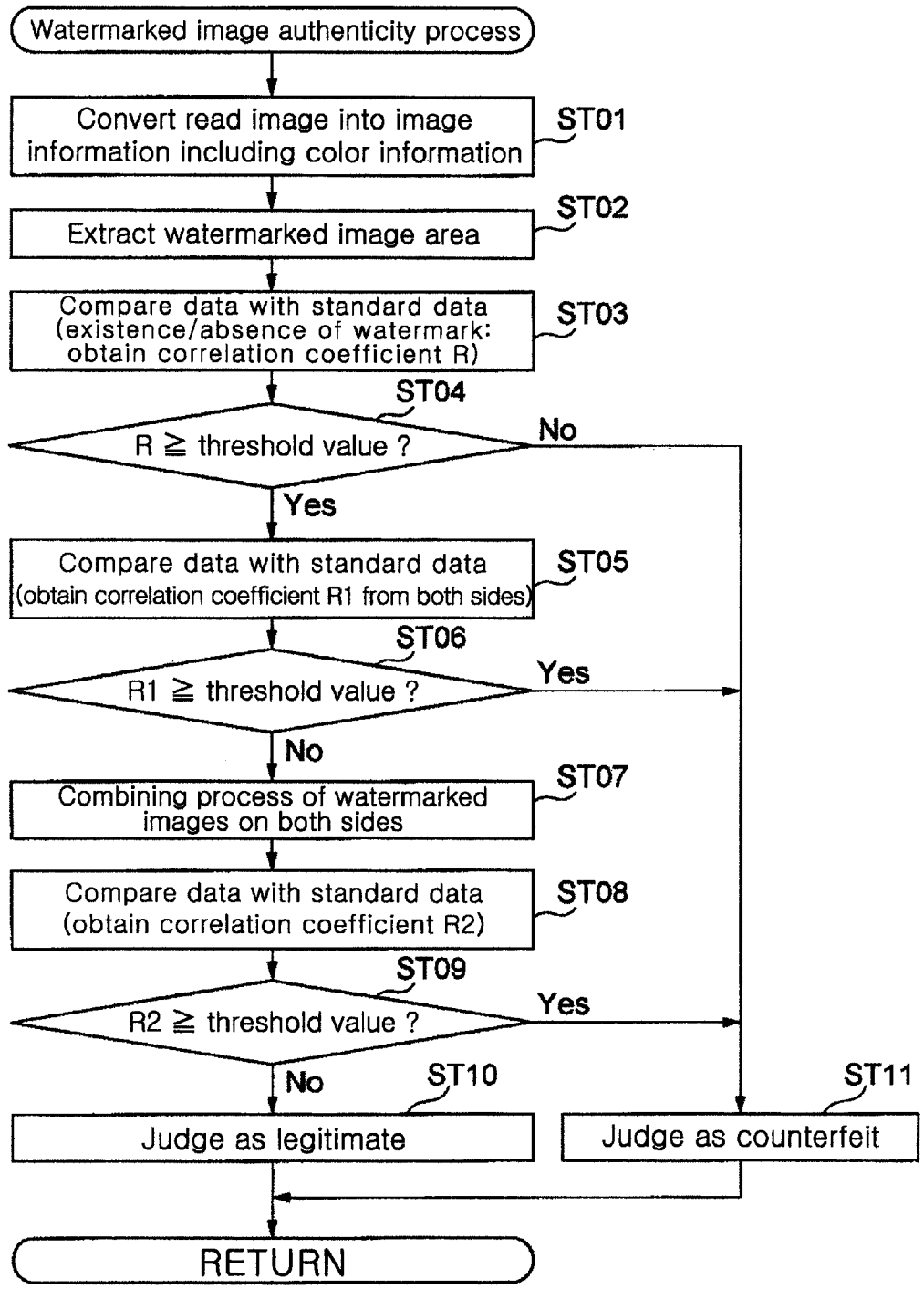
FIG. 6 shows a flowchart illustrating processing operations of an authenticity judgment of the bill.

Hereinafter, an example of a technique for an authenticity identification process based on the watermarked image will be described in detail with reference to a flowchart of FIG. 6 and diagrams of FIGS. 7 to 12. In addition, such an authenticity identification process based on the watermarked image is executed as one of the bill authenticity identification processes including some other bill authenticity identification processes to be conducted than this embodiment.

First, the bill reading means 8 performs reading of a bill being conveyed, and a conversion process of the image into pixel information containing color information is performed by the converter 232 (ST01). As described above, the bill reading means 8 irradiates the bill being conveyed by the bill conveyance mechanism with the light (red light and infrared light) from the light emitting parts 81a, 81b and the light emitting parts 82a, 82b disposed on both surface sides, and receives a transmitted light or a reflected light therefrom with the light receiving parts (line sensors) 81c, 82c, so as to execute the reading of the bill. It is possible to acquire many pieces of pixel information for a predetermined size of pixel as a unit per each irradiation light while the conveyance processing of the bill is conducted in the reading process, and the image data constituted of many pixels acquired in this way is stored in storage means (e.g., memory) such as a RAM 224. And, here, the image data constituted of many pixels being stored is converted into color information having brightness (color information to which a numerical value from 0 to 255 (0: black to 255: white) corresponding to each density value is allocated) for each pixel by the converter 232.

Next, a process of extracting a watermarked image area is conducted from the pixel information being converted in this way (ST02). In this step, since the density value of the pixel information is increased (pixel is whitened) in a stage that the detected area is shifted from the printed area to the watermarked area as the bill is conveyed, for example, it is possible to extract the watermarked image area by setting a threshold value associated with such a change and a position thereof and detecting the position. It is, as a matter of course, possible to extract the watermarked image area by various methods on the basis of the acquired image information or the converted image information. Further, as the irradiating light used for extracting the watermarked image, any one of the red light and the infrared light of the transmitted light, and the red light and the infrared light of the reflected light (or a combination thereof) among a plurality of light sources may be used.

Next, in the identification processing part 235, the standard data (the standard data by the transmitted light of the watermarked image as a comparison object) stored in advance in the reference data storage part 233 is extracted by use of the above-mentioned parameters, and a comparison process between the standard data and the image data converted from the reflected light by the converter is performed (ST03).

Figures 7, 8:
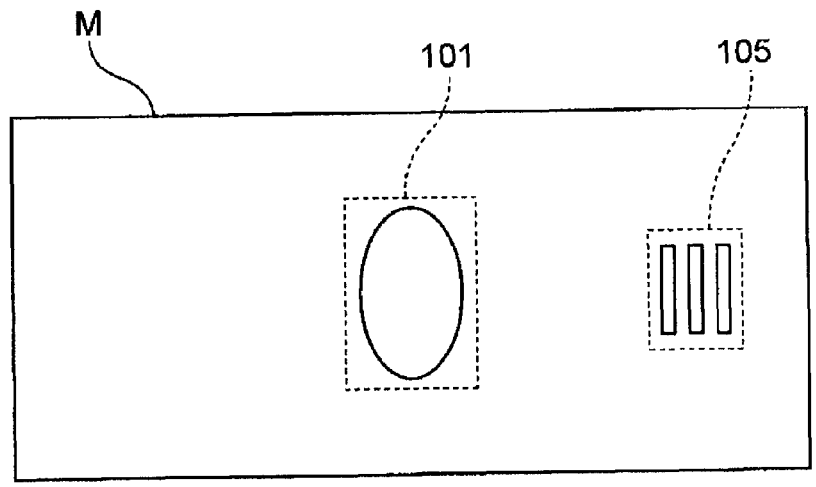
FIG. 7 is a diagram showing a schematic configuration of reference image data of the bill on which a watermark is formed.
FIG. 8 is a diagram showing reference image data acquired by a transmitted light from a watermark forming area of the bill.

In this case, the standard data to be extracted is, for example, as shown in FIG. 7, a two-dimensional image of a watermark area 101 or a see-through mark forming area 105 by use of the above-mentioned parameters if a standard image of the bill M is stored in the reference data storage part 233 (the watermark forming area 105 is extracted and an authenticity judgment process is preformed in this embodiment).

The above-mentioned comparison process in ST03 (referred to as "a first comparison process") is a process for judging the presence or absence of the watermark, in which the authenticity of the bill being conveyed is to be identified by deriving the correlation coefficient R given by the following formula 1 between the image information of the watermark area by the transmitted light from the bill being conveyed and the image information of the standard image of the watermark area by the transmitted light.

$$R = \frac{\sum_i \sum_j (f[i, j] - F)(s[i, j] - S)}{\sqrt{\sum_i \sum_j (f[i, j] - F)^2} \sqrt{\sum_i \sum_j (s[i, j] - S)^2}} \qquad \text{[Formula 1]}$$

In the above-mentioned formula 1, [i, j] corresponds to the coordinate of the area on which the watermark of the bill is formed, and a density value of a two-dimensional image of the data acquired from the bill serving as an identification object of the bill coordinate [i, j] is set to f[i, j], a density value of the standard data is set to s [i, j], an average density of the acquired data is set to F, and an average density value of the standard data is set to S.

The correlation coefficient R derived by the above-described formula 1 is a comparison between the transmitted light data obtained from the bill being conveyed and the reference data by the transmitted light, and therefore, when the correlation coefficient R is lower than a predetermined threshold value, it is judged that the watermark itself is not formed on the bill, and the bill is judged as a counterfeit bill (ST04; No, ST11). That is, the bill on which the watermark itself is not formed is eliminated by this process (first comparison process). Here, transmitted light data obtained from the bill being conveyed may be what is detected by one of the light receiving parts 81c and 82c, or by the both of them with respect to the data for use.

On the other hand, if the correlation coefficient R is equal to or greater than the threshold value, subsequently the second comparison process is preformed (ST05). In this comparison process, the correlation coefficients R shown by the above-described formula 1 are derived from the relationship between the standard data and the image data obtained by the reflected light on the both surface sides of the bill to be conveyed, i.e., in the respective light receiving parts 81c and 82c such that the authenticity of the bill being conveyed is identified.

This authenticity identification process will be described with reference to FIGS. 8 to 10. FIG. 8 shows data which contains brightness information for each pixel and is standard image data (which is stored in advance in the reference data storage part 233) by the transmitted light in the watermark forming area 105 of the bill. In addition, in FIG. 8, in order to simplify the description, it is assumed that a length of twelve (12) pixels is taken in one direction (vertical direction) and a length of seven (7) pixels is taken in the traveling direction (horizontal direction) such that the see-through mark forming area 105 is extracted.

Further, FIGS. 9A and 9B show data for each pixel by the reflected light in the see-through patterned mark forming area 105 of the bill being conveyed in the case of the legitimate bill. FIG. 9A shows image data by the reflected light obtained from the front surface, and FIG. 9B shows image data by the reflected light obtained from the rear surface. As is clear from the pixel data, if the bill is a legitimate bill, no relevance (similarity) is recognized between the image data by the reflected light obtained from the both surface sides and the standard image data shown in FIG. 8.

On the other hand, FIGS. 10A and 10B show data for each pixel by the reflected light from the watermark forming area 105 of the bill to be conveyed in the case of the bill (counterfeit bill) on which the watermark is printed on the rear surface. FIG. 10A shows image data by the reflected light acquired from the front surface and FIG. 10B shows image data by the reflected light acquired from the rear surface.

When the see-through patterned mark is formed by printing on one surface (rear surface) of the bill, the image data by the reflected light acquired therefrom is to resemble the image data by the transmitted light. Accordingly, the correlation coefficients R1 are calculated from density values for each pixel of image data by reflected lights on the both surface sides of a bill and the density value for each pixel of the standard data by the transmitted light, respectively, and when one or both correlation coefficients R1 are greater than or equal to a predetermined threshold value, it is judged that the watermark is formed on that surface, and the bill is judged as a counterfeit bill (ST06; Yes, ST11). That is, the bill, either surface of which the watermark is printed on, is eliminated in this process (second comparison process).

Moreover, in this embodiment, image data by respective reflected lights received by the light receiving parts 81c and 82c are combined into one image so as to obtain a density value for each pixel, and the authenticity of the watermarked image is to be identified (to perform the third identification process) based on the density value for each pixel of the thus-obtained combination image and the density value for each pixel of the standard data.

This is because, as described above, although the bill which does not have the watermark formed thereon can be eliminated by the first comparison process and the bill, either surface of which the watermarked image is formed on, can be eliminated by the second comparison process, in the case where a pattern which is the same as the watermark is printed half-and-half on the front surface and the rear surface, respectively, the correlation coefficient between the front surface and the rear surface may not be beyond the predetermined threshold value. For example, as shown in FIGS. 11A and 11B, when a part of the watermark design is printed on an A area of the front surface, and the remaining part of the watermark design is printed on a B area of the rear surface, there may be a possibility that the bill cannot be eliminated by the above-described first comparison process and the second comparison process.

Then, after the process of ST06 as described above, image data by respective reflected lights received by the light receiving parts 81c and 82c are processed to be combined to obtain one image (ST07), and a correlation coefficient R2 is calculated from a density value for each pixel of the combination image and the density value for each pixel of the watermarked image of the paper sheet by the transmitted light serving as the standard (ST08), and then, if the correlation coefficient R2 is greater than a predetermined threshold value, the bill is judged as a counterfeit bill (ST09; Yes, ST11) because it is judged that the watermark is printed partially and separately on the both surface sides.

That is, it is possible to eliminate the bill which has the watermark printed partial and separately on both surface sides thereof by carrying out such a process (the third comparison process), and it is possible to further improve the identification accuracy.

As described above, provided that the light receiving/emitting units 81 and 82 are installed on the both surface sides of the bill to be conveyed and that image data by the reflected lights are acquired by the respective light receiving parts, it is possible to accurately identify the authenticity of the watermark formed on the bill.

In addition, the calculations of the correlation coefficients in ST03, ST05, and ST08 as described above are conducted by the identification processing part 235. When the correlation coefficients are calculated, a position correction (referred to as "a local search") is performed by moving the pixel position of the watermarked image acquired such that the moved pixel position correspond to the pixel position of the standard image of the bill serving as the reference and that the watermarked image in the moved pixel position in which the absolute value of the correlation coefficient between both images shows the maximum value is extracted to identify the authenticity of the bill.

That is, with respect to the bill to be conveyed, it is considered that some watermarks may be formed in slightly different positions on the respective bills and the conveyed bill may be inclined to some extent depending on the traveling condition. Therefore, the watermarked image read by the bill reading means 8 from the bill being conveyed may be shifted to some extent, and even if the correlation coefficient is obtained in such a condition, the adequate identification may not be performed.

Figure 12:
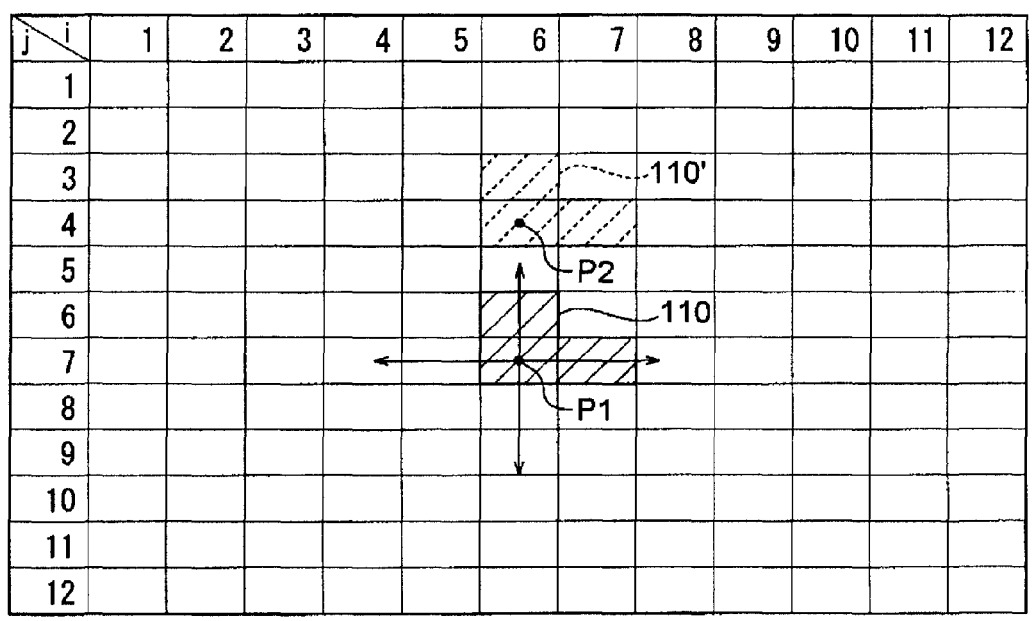
FIG. 12 is a diagram illustrating an array of pixels including color information and explaining a general operation of a local search.

Therefore, as schematically shown in FIG. 12, the acquired image data in the watermark area is, for example, as indicated by arrows, displaced up and down, and left and right by a predetermined number of pixels (the figure illustrates a situation that a position P1 of a characteristic image 110 is moved to a position P2 of the image 110' when the whole image data is shifted upward by three pixels), and values of the correlation coefficients are calculated by the above-mentioned formula 1 for the images in the respective displaced positions. That is, in executing such a position correction, for example, if the local search is performed by shifting the image data up and down, and from left and right by four pixels (±4 pixels), eighty one (81) kinds of correlation coefficients in total are derived, as a result of the local search. Then, the derived respective correlation coefficients are stored one after another in the RAM 224, and after all of the correlation coefficients are calculated eventually, the position in which the maximum absolute value of the correlation coefficient is obtained is specified as the position of the authenticity identification object.

In this way, even if the legitimate bill on which the watermark is formed is conveyed as the position of the watermark is more or less deviated in the bill, the position correction is performed by moving the pixel position of the acquired image around the original ones such that it is less likely that even the legitimate bill is identified as a counterfeit bill whereby the identification accuracy may be improved. In addition, if the aforementioned local search is executed in the comparison process of ST03 as described above, the information subjected to the position correction may be directly applied in the processes of the above-mentioned ST05 and ST08.

Figure 13:
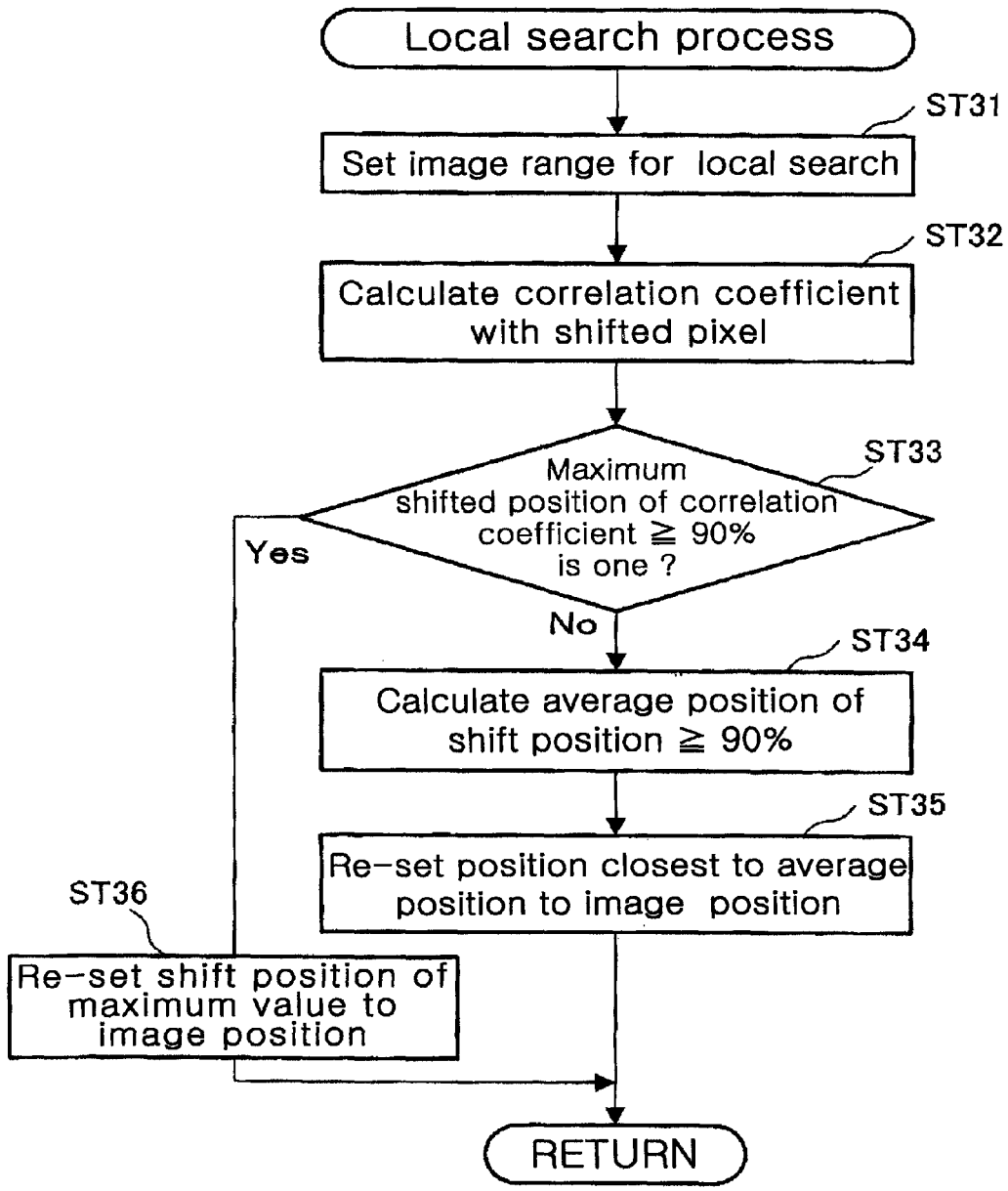
FIG. 13 shows a flowchart illustrating processing operations of a local search process.

FIG. 13 shows a flowchart illustrating another embodiment than the embodiment having been described so far. Here, one example of the local search process is shown. Such a local search process may be performed, for example, in the comparison process in ST03 or before the processes of ST05 and ST08. When such a process is performed for an overly broad range, inconvenience such as lowering of a processing speed is brought about. Therefore, in particular, a shape or a pattern appropriate for positioning is determined in advance, and the following process may be performed for a small area where there is the shape or pattern. A size of the small area is preferably smaller than that of an area including the entire image for the authenticity identification and is preferably a size to such an extent that it is possible to include the shape or the pattern which can determine positions longitudinally and laterally. In this way, a range (small area) including the image suitable for the local search is set (ST31). Then, for example, centering on a pixel on the center of this small area (or closest to the center), the pixel information is vertically and horizontally shifted plus or minus a predetermined number of pixels (m, n), to respectively calculate correlation coefficients in this small area (ST32). Thereby, a distribution chart of the correlation coefficients in the case where the small area is vertically and horizontally shifted plus or minus several pixels (m, n) is obtained. In this distribution chart, a maximum value (1 or less) is determined. In such a distribution chart, a plurality of correlation coefficients, which are less than or equal to the maximum value, may have rather great values. In that case, such numbers are picked up on the basis of a predetermined criterion. For example, when there are a plurality of correlation coefficients which are 90% or more of the maximum value as in ST33 (ST33; No), a mean position thereof is calculated and the shifted positions thereof are stored (ST34). Then, a mean position of those shifted positions (for example, which may correspond to the center of gravity) can be determined on the basis of a shift number that is an integer (ST35). For example, when values at shifted positions (0, 0), (0, −1), (0, −2), (0, −3), (1, 0), (1, −1), (1, −2), and (2, −2) are values close to the maximum value, it is possible to obtain a shifted position of (0.625, −1.375) as the center of gravity. Therefore, it is possible to shift the entire image by setting the shifted position (1, −1) expressed by the closest integer as the shifted position to be corrected.

On the other hand, in the case where there is one correlation coefficient which is 90% or more of the maximum value (that is, values of correlation coefficients at shifted positions other than the shifted position having a correlation coefficient that is the maximum value are all less than 90% of the maximum value) (ST33; Yes), the one shifted position is specified. Then, this shifted position is re-set as the pixel position. In this way, after the local research process is performed and the position correction is carried out, the process returns to the main flow in order to perform various processes for judging the authenticity.

For example, in the case where there is an image to be measured as shown in FIG. 14, a small area is regulated by i=3 to 6, j=5 to 10 (refer to the standard image of FIG. 8 and the image to be measured of FIG. 14), and the small area is shifted plus or minus two pixels, to determine respective correlation coefficients with respect to the standard image of FIG. 8. The results are shown in FIG. 15. In the case where the small area is shifted by 0 in the i and j directions (that is, there is no shift), the correlation coefficient is maximized (0.981). Since the remaining correlation coefficients are all considerably less than the maximum value (for example, less than 90% (0.883) of the maximum value), this position which is not shifted is an appropriate corrected position.

As described above, in this embodiment, information of the watermarked image (two-dimensional image information) for preventing counterfeiting in the bill is acquired, and the acquired information is compared with the watermarked image information serving as the reference (standard data), whereby the accuracy of the authenticity identification may be improved.

In addition, as long as the bill identification apparatus is configured to be capable of processing many types of bills, the identification processing steps for the watermarked portion as described above are carried out after an identification process for determining the money type of the bill (which country issued in which kind of series of bill with which face value) is completed. Therefore, since the position where the watermark is formed is set for each money type, the standard data may be stored so as to correspond to the set position.

Further, in the above-mentioned configuration, the data stored in advance in the reference data storage 233 is used as the standard data by the transmitted light from the watermark area. However, such data by the transmitted light may be acquired from the bill being conveyed. That is, if the image data is acquired by the reflected light and the transmitted light from the watermark area of the bill being conveyed and the above-mentioned process is performed, the authenticity of the watermark area can be identified.

As mentioned above, the embodiment of the present invention is described. However, the present invention is not limited to the above-described embodiment, and various modifications of the present invention can be implemented.

As described above, the present invention has a feature in identifying the authenticity of the bill with respect to the image information of the watermarked portion of the bill serving as the identification object such that, by acquiring the reflected light data, the authenticity is identified by comparing the acquired data with the standard data by the transmitted light. And the other configurations are not limited to those in the above-mentioned embodiment. Therefore, it may be configured such that the above-mentioned first comparison process or the third comparison process may not be performed. In addition, in the above-mentioned identification method for the authenticity, the technique as described above may be performed as one of the authenticity identification processes with various kinds of techniques and it may also be configured to include another authenticity identification process than this. In this case, a priority order of executions of this process and other authenticity identification processes is not limited thereto.

Further, in the abovementioned configuration, the correlation coefficient is calculated, by the identification processing part 235, from a density value for each pixel by the reflected light from the bill being conveyed and a density value for each pixel of the standard data stored in the reference data storage part 233, and it is judged whether the bill is the legitimate bill or a counterfeit bill on the basis of the correlation coefficient. However, various types of techniques may be employed in the identification method. For example, a concrete method for identifying the authenticity may be appropriately modified such that amounts of variations in the respective pixels to be compared between image data by the reflected light and image data serving as a standard are calculated such that the authenticity is identified on the basis of its average value, or the like.

The paper sheet identification apparatus as described above as an embodiment includes: first light receiving means (for example, light receiving parts 81c and 82c) and second receiving means (for example, light receiving parts 81c and 82c) for receiving the reflected lights on a front surface and a rear surface with respect to a watermarked image formed on a paper sheet being conveyed; a converter (for example, converter 232) which converts the reflected light from the watermarked image, being received by the first light receiving means and the second light receiving means, into data for each pixel of a predetermined size as a unit, which contains color information having brightness; and an identification processing part (for example, identification processing part 235) which identifies the authenticity of the watermarked image based on a density value, converted by the converter, for each pixel of images received by the first light receiving means and the second light receiving means and a density value for each pixel of the watermarked image by the transmitted light of the paper sheet as the standard.

In general, the watermark formed on a paper sheet such as a bill does not appear as it is seen when a two-dimensional image is acquired from the reflected light upon irradiating the bill if the watermark is legitimate. However, in the case of the bill which has the watermark counterfeited by faintly printing on either surface side thereof, when the bill is irradiated with the light and the two-dimensional image is acquired from its reflected light, the watermarked image shows up as it is seen. Since a watermarked image obtained in this way is in a relationship of closely resembling an image by a transmitted light of a watermarked image of a legitimate bill, in the paper sheet identification apparatus according to the present invention, the light receiving means (the first light receiving means and the second light receiving means) are installed on the both sides of the paper sheet to be conveyed, to accurately identify the authenticity thereof by utilizing the relationship.

That is, when the watermark is legitimate, the density value of each pixel of the watermarked image obtained by the converter from the reflected light on the both surface sides and the density value of each pixel obtained from the transmitted light at the same position of the bill to be conveyed do not have any relevancy. However, if the watermark is counterfeited by faintly printing on either surface of the bill, the density value of each pixel acquired by the reflected light on the surface is highly related to the density value of each pixel acquired by the transmitted light at the same position. Therefore, if the density value of each pixel obtained by the reflected light on one of the both surfaces and the density value of each pixel obtained by the transmitted light are highly related, it is possible to identify the watermark as a counterfeit watermark. In addition, the density value for each pixel by the transmitted light from the watermarked image of the paper sheet serving as the reference may be actually acquired by the transmitted light from the paper sheet being conveyed, or may be stored in advance as the reference value in the identification processing part.

Further, one of the first light receiving means and the second light receiving means is capable of receiving the transmitted light from the watermarked image of the paper sheet being conveyed, and the identification processing part identifies the authenticity of the watermarked image based on the density value for each pixel by the transmitted light from the watermarked image acquired by the first light receiving means or the second light receiving means, and the density value for each pixel by the transmitted light from the watermarked image of the paper sheet serving as the reference.

According to the paper sheet identification apparatus as configured above, since the authenticity is identified based on the density value for each pixel by the transmitted light from the watermarked image of the paper sheet being conveyed and the density value for each pixel by the transmitted light from the watermarked image of the paper sheet serving as the reference, the paper sheet on which no watermarked design is formed can be eliminated.

Further, the identification processing part calculates the correlation coefficient from the density value for each pixel by the reflected light from the watermarked image of the paper sheet being conveyed and the density value for each pixel by the transmitted light from the watermarked image of the paper sheet serving as the reference, whereby the authenticity of the watermarked image can be identified based on the correlation coefficient.

According to the paper sheet identification apparatus as configured above, the correlation coefficient is calculated from the density value for each pixel by the reflected light from the watermarked image of the paper sheet being conveyed and the density value for each pixel by the transmitted light from the watermarked image of the paper sheet serving as the reference. In this case, with respect to the correlation coefficient to be calculated, if the value of the correlation coefficient of either surface is higher than the threshold value having been determined in advance, it is judged that the watermark is formed by printing, whereby the bill can be judged as counterfeit.

Further, the identification processing part calculates the correlation coefficient from the density value for each pixel by the transmitted light from the watermarked image of the paper sheet being conveyed and the density value for each pixel by the transmitted light from the watermarked image of the paper sheet serving as the reference, and the authenticity of the watermarked image is identified based on the correlation coefficient.

According to the paper sheet identification apparatus as configured above, the correlation coefficient is calculated from the density value for each pixel by the transmitted light from the watermarked image of the paper sheet being conveyed and the density value for each pixel by the transmitted light from the watermarked image of the paper sheet serving as the reference. In this case, with respect to the correlation coefficient to be calculated, if the value of the correlation coefficient is smaller than the threshold value having been determined in advance, the paper sheet can be judged as a counterfeit one as it does not have the watermarked design formed thereon.

Further, when the identification processing part calculates the correlation coefficient, the identification processing part executes the position correction by moving the pixel position of the acquired watermarked image so as to correspond to the pixel position of the watermarked image of the paper sheet serving as the reference, so as to extract the pixel position in which the maximum absolute value of the correlation coefficient is obtained, and can identify the authenticity of the bill.

In accordance with the paper sheet identification apparatus as configured above, even if the legitimate paper sheet on which the watermark is formed is conveyed as the position of the watermark is more or less deviated on the paper sheet, the position correction is performed by moving the pixel position of the acquired image around the original ones such that it is less likely that even the legitimate paper sheet is identified as a counterfeit paper sheet whereby the identification accuracy may be improved. In addition, if such position correction is executed in a wide range, a disadvantage such as decrease in the processing speed may be caused. Therefore, for example, a shift search may be performed by moving the area up and down, and left and right by several pixels (±several pixels) as a certain given point is centered. Therefore, such position correction is referred to as a local search.

Moreover, the identification processing part acquires the density value for each pixel as one image after combining the watermarked images by the lights received by the first light receiving means and the second light receiving means, respectively, and identifies the authenticity of the watermarked image based on the density value for each pixel of thus-acquired combined image and the density value for each pixel by the transmitted light from the watermarked image of the paper sheet as the reference.

In accordance with the paper sheet identification apparatus with the above-described configuration, since watermarked images by reflected lights obtained from the both surface sides of the paper sheet are combined, for example, it is possible to eliminate a counterfeit watermark which is formed such that a part of a watermarked image is printed on one surface and the remaining part thereof is printed on the other surface, whereby the authenticity identification accuracy may be improved.

Further, the paper sheet identification method of the above-mentioned embodiment, comprises: an image acquisition step of acquiring a reflected light from a watermarked image formed on a paper sheet being conveyed for each pixel as a unit of a predetermined size including color information having brightness; and an authenticity identification step of identifying an authenticity of the watermarked image by the reflected light based on a density value for each pixel of the watermarked image by the reflected light acquired from respective surfaces of the watermarked image and a density value for each pixel of the watermarked image by transmitted light of a paper sheet as a reference.

As described above, in the case where the watermark formed on the paper sheet such as the bill is legitimate, when the light is irradiated and the two-dimensional image is acquired from the reflected light thereon, the watermarked image does not appear as it is seen. However, in the case of the bill which has the watermark counterfeited by faintly printing the mark on either surface thereof, when the bill is irradiated with the light and the two-dimensional image is acquired from its reflected light, the watermarked image appears as it is seen. Since the watermarked image obtained in this way is in a relationship of closely resembling the image of the watermarked image of the legitimate bill by the transmitted light, the paper sheet identification method of the present invention utilizes this relationship such that the method is configured to acquire the reflected lights on both surface sides of the paper sheet being conveyed.

That is, when the watermark is legitimate, the density value of each pixel obtained by the reflected light of the watermarked image from the both surface sides of the paper sheet being conveyed and the density value of each pixel obtained by the transmitted light at the same position do no have any relevancy. However, if the watermark is counterfeited by faintly printing the mark on one of the surfaces of the paper sheet, the density value of each pixel obtained by the reflected light of the surface is highly related to the density value of each pixel obtained by the transmitted light at the same position. Therefore, when the density value of each pixel obtained by the reflected lights from either or both surfaces and the density value of each pixel obtained by the transmitted light are highly related, it is possible to judge the watermark as a counterfeit watermark.

Further, the image acquisition step comprises: acquiring a transmitted light from the watermarked image formed on the paper sheet being conveyed for each pixel as one unit of a predetermined size, which includes color information having brightness; and an authenticity identification step of identifying the watermarked image by the transmitted light based on a density value for each pixel by the transmitted light from the watermarked image acquired in the image acquisition step and a density value for each pixel by the transmitted light from the watermarked image of the paper sheet serving as the reference.

According to the paper sheet identification method as configured above, the authenticity is identified based on the density value for each pixel by the transmitted light from the watermarked image of the paper sheet being conveyed and the density value for each pixel by the transmitted light from the watermarked image of the paper sheet serving as the reference such that the paper sheet on which no watermarked design is formed can be eliminated.

Further, in the authenticity identification step by the reflected light and the authenticity identification step by the transmitted light, a position correction is conducted by moving a pixel position of the acquired watermarked image so as to correspond to the pixel position of the watermarked image of the paper sheet serving as the reference such that the authenticity is identified.

According to the paper sheet identification method as configured above, even if the legitimate paper sheet has the watermark formed in a more or less deviated position, the position correction is performed by moving the pixel position of the acquired image around the original ones such that it is less likely that even the legitimate paper sheet is identified as a counterfeit paper sheet, whereby the identification accuracy may be improved.

Moreover, the authenticity identification step by the reflected light comprises: obtaining a density value for each pixel of one image by combining the respective watermarked images acquired from both surface sides; and identifying the authenticity of the watermarked image based on the density value for each pixel of the thus-combined image and the density value for each pixel by the transmitted light of the watermarked image of the paper sheet serving as the reference.

In accordance with the paper sheet identification method as configured above, since the watermarked images by reflected lights obtained from the both surface sides of the paper sheet are combined, for example, it is possible to eliminate a counterfeit watermark which is formed such that a part of a watermarked image is printed on one surface and the remaining part thereof is printed on the other surface, whereby the authenticity identification accuracy can be improved.

As described above, the paper sheet identification apparatus which can identify the authenticity of the watermarked area formed on the paper sheet may be provided and the paper sheet identification method utilized therefor may also be provided.

INDUSTRIAL APPLICABILITY

The present invention can be incorporated into various types of apparatuses to identify the authenticity of the paper sheet other than the bill such as a gift certificate and a coupon ticket, in addition to the above-mentioned bill.

What is claimed is:

1. A paper sheet identification apparatus comprising:
a first light receiving part and a second light receiving part which receive lights reflected on a front surface and a rear surface, respectively, with respect to a watermarked image formed on a paper sheet being conveyed;
a converter which converts watermarked images by reflected lights received by the first light receiving part and the second light receiving part, respectively, into data for each pixel as a unit of a predetermined size, the data including color information having brightness; and
an identification processing part which identifies an authenticity of the watermarked image based on a density value for each pixel converted by the converter, the density value being from the first light receiving part and the second light receiving part, and a density value for each pixel by a transmitted light of a watermarked image of a paper sheet serving as a reference.

2. The paper sheet identification apparatus according to claim 1, wherein:
one of the first light receiving part and the second light receiving part is capable of receiving a transmitted light from the watermarked image of the paper sheet being conveyed, and
the identification processing part identifies the authenticity of the watermarked image based on a density value for each pixel by the transmitted light of the watermarked image received by the one of the first light receiving part and the second light receiving part and the density value for each pixel by the transmitted light of the watermarked image of the paper sheet serving as the reference.

3. The paper sheet identification apparatus according to claim 1, wherein:
the identification processing part calculates a correlation coefficient from the density value for each pixel by the reflected lights acquired from the watermarked image of the paper sheet being conveyed and the density value for each pixel by the transmitted light of the watermarked image of the paper sheet serving as the reference.

4. The paper sheet identification apparatus according to claim 2, wherein:
the identification processing part calculates a correlation coefficient from the density value for each pixel by the transmitted light acquired from the watermarked image of the paper sheet being conveyed and the density value for each pixel by the transmitted light of the watermarked image of the paper sheet serving as the reference, and identifies the authenticity of the watermarked image based on the correlation coefficient.

5. The paper sheet identification apparatus according to claim 3, wherein:
the identification processing part conducts a position correction so as to match a pixel position of the watermarked image of the paper sheet serving as the reference when the correlation coefficient is calculated, and extract a pixel position where an absolute value of the correlation coefficient becomes highest so as to identify the authenticity.

6. The paper sheet identification apparatus according to claim 1, wherein:
the identification processing part obtains a density value for each pixel for one image synthesized by combining respective watermarked images received by the first light receiving part and the second light receiving part, and identifies the authenticity of the watermarked image based on the density value for each pixel of the synthesized image and the density value for each pixel by the transmitted light of the watermarked image of the paper sheet serving as the reference.

7. A paper sheet identification method comprising:
an image acquisition step of acquiring lights reflected from both surface sides of a watermarked image formed on a paper sheet being conveyed for each pixel as a unit of a predetermined size including color information having brightness;
an authenticity identification step of identifying an authenticity of the watermarked image by a reflected light based on a density value for each pixel by the reflected lights acquired on the respective surface sides of the watermarked image and a density value for each pixel by a transmitted light of a watermarked image of a paper sheet serving as a reference.

8. The paper sheet identification method according to claim 7, wherein:
the image acquisition step comprises: acquiring a transmitted light of the watermarked image formed on the paper sheet being conveyed for each pixel as a unit of a predetermined size including color information having brightness,
the method further comprises:
an authenticity identification step of identifying the authenticity of the watermarked image by a transmitted light based on a density value for each pixel by the transmitted light of the watermarked image acquired in the image acquisition step and the density value for each pixel by the transmitted light of the watermarked image of the paper sheet serving as the reference.

9. The paper sheet identification method according to claim 7, wherein:
in the authenticity identification step by the reflected light and in the authenticity identification step by the transmitted light, a pixel position of the watermarked image acquired is so move to conduct a position correction such that the pixel position of the watermarked image acquired matches a pixel position of the watermarked image of the paper sheet serving as the reference, and the authenticity is identified.

10. The paper sheet identification method according to claim 7, wherein:
the authenticity identification step by the reflected light comprises:
obtaining a density value for each pixel for one image synthesized by combining the respective watermarked images acquired from both surface sides; and
identifying the authenticity of the watermarked image based on the density value for each pixel of the synthesized image and the density value for each pixel by the transmitted light of the watermarked image of the paper sheet serving as the reference.

11. The paper sheet identification apparatus according to claim 4, wherein:
the identification processing part conducts a position correction so as to match a pixel position of the watermarked image of the paper sheet serving as the reference when the correlation coefficient is calculated, and extract a pixel position where an absolute value of the correlation coefficient becomes highest so as to identify the authenticity.

12. The paper sheet identification apparatus according to claim 2, wherein:
the identification processing part obtains a density value for each pixel for one image synthesized by combining respective watermarked images received by the first light receiving part and the second light receiving part, and identifies the authenticity of the watermarked image based on the density value for each pixel of the synthesized image and the density value for each pixel by the transmitted light of the watermarked image of the paper sheet serving as the reference.

13. The paper sheet identification apparatus according to claim 3, wherein:
    the identification processing part obtains a density value for each pixel for one image synthesized by combining respective watermarked images received by the first light receiving part and the second light receiving part, and identifies the authenticity of the watermarked image based on the density value for each pixel of the synthesized image and the density value for each pixel by the transmitted light of the watermarked image of the paper sheet serving as the reference.

14. The paper sheet identification apparatus according to claim 4, wherein:
    the identification processing part obtains a density value for each pixel for one image synthesized by combining respective watermarked images received by the first light receiving part and the second light receiving part, and identifies the authenticity of the watermarked image based on the density value for each pixel of the synthesized image and the density value for each pixel by the transmitted light of the watermarked image of the paper sheet serving as the reference.

15. The paper sheet identification apparatus according to claim 5, wherein:
    the identification processing part obtains a density value for each pixel for one image synthesized by combining respective watermarked images received by the first light receiving part and the second light receiving part, and identifies the authenticity of the watermarked image based on the density value for each pixel of the synthesized image and the density value for each pixel by the transmitted light of the watermarked image of the paper sheet serving as the reference.

16. The paper sheet identification method according to claim 8, wherein:
    the authenticity identification step by the reflected light and in the authenticity identification step by the transmitted light, a pixel position of the watermarked image acquired is so move to conduct a position correction such that the pixel position of the watermarked image acquired matches a pixel position of the watermarked image of the paper sheet serving as the reference, and the authenticity is identified.

17. The paper sheet identification method according to claim 8, wherein:
    the authenticity identification step by the reflected light comprises:
        obtaining a density value for each pixel for one image synthesized by combining the respective watermarked images acquired from both surface sides; and
        identifying the authenticity of the watermarked image based on the density value for each pixel of the synthesized image and the density value for each pixel by the transmitted light of the watermarked image of the paper sheet serving as the reference.

18. The paper sheet identification method according to claim 9, wherein:
    the authenticity identification step by the reflected light comprises:
        obtaining a density value for each pixel for one image synthesized by combining the respective watermarked images acquired from both surface sides; and
        identifying the authenticity of the watermarked image based on the density value for each pixel of the synthesized image and the density value for each pixel by the transmitted light of the watermarked image of the paper sheet serving as the reference.

* * * * *